(12) United States Patent
Mendis et al.

(10) Patent No.: US 12,187,248 B2
(45) Date of Patent: Jan. 7, 2025

(54) ELECTRONIC PARKING BRAKE RELEASE SYSTEM AND METHOD

(71) Applicant: Bendix Commercial Vehicle Systems LLC, Avon, OH (US)

(72) Inventors: Meviltan Mendis, Pune (IN); Christopher H. Hutchins, Bay Village, OH (US); Khaled Jundi, Hinckley, OH (US); Niket Mokashi, Wakad (IN); Pinak Paraklar, Pune (IN)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 0 days.

(21) Appl. No.: 17/797,336

(22) PCT Filed: Jul. 8, 2022

(86) PCT No.: PCT/US2022/036440
§ 371 (c)(1),
(2) Date: Aug. 3, 2022

(87) PCT Pub. No.: WO2023/101723
PCT Pub. Date: Jun. 8, 2023

(65) Prior Publication Data
US 2024/0182013 A1 Jun. 6, 2024

(30) Foreign Application Priority Data
Nov. 30, 2021 (IN) .............................. 202111055479

(51) Int. Cl.
*B60T 13/68* (2006.01)
*B60T 15/04* (2006.01)

(52) U.S. Cl.
CPC .......... *B60T 13/683* (2013.01); *B60T 15/041* (2013.01)

(58) Field of Classification Search
CPC ........ B60W 10/182; B60W 2510/186; B60W 2710/186; B60T 17/16; B60T 7/10;
(Continued)

(56) References Cited

U.S. PATENT DOCUMENTS 6,322,161 B1  11/2001  Maslonka et al.
6,450,587 B1   9/2002  Macgregor
(Continued)

FOREIGN PATENT DOCUMENTS

AU    2003200668 A1   9/2003
DE    102007014427 A  9/2008

OTHER PUBLICATIONS

Manitoba Public Insurance "Air Brake Manual; Working with Drivers to Make Our Roads Safer" DVL0025/0337-16-B3 (R-2010) (102 pages).

(Continued)

*Primary Examiner* — Lori Wu
(74) *Attorney, Agent, or Firm* — Tucker Ellis LLP

(57) ABSTRACT

An apparatus controls release of a parking brake of a parking brake system of an associated vehicle. A processor of an electronic control system of the apparatus executes parking brake control logic stored in a non-transient memory device to selectively generate a parking brake release (PBR) signal based on receiving a set of predetermined PBR interlock override signals in an absence of receiving fully all of a set of predetermined PBR interlock standard satisfaction signals, wherein receiving fully all of the set of predetermined PBR interlock standard satisfaction signals causes the processor executing the parking brake control logic to generate the PBR signal. The sets of predetermined PBR interlock override and interlock standard satisfaction signals are mutually different, and the PBR signal is deliverable for use (Continued)

by the associated vehicle to effect the release of the parking brake of the parking brake system of the associated vehicle.

20 Claims, 8 Drawing Sheets

(58) Field of Classification Search
CPC ........ B60T 7/12; B60T 13/261; B60T 13/686; B60T 15/041; F16H 2059/746
See application file for complete search history.

(56) References Cited

U.S. PATENT DOCUMENTS

| | | | |
|---|---|---|---|
| 7,396,089 B2 | 7/2008 | Bennett et al. | |
| 7,448,699 B2 * | 11/2008 | Manaka | B60T 7/122 188/71.9 |
| 8,480,183 B2 | 7/2013 | Morris et al. | |
| 8,794,715 B2 | 8/2014 | Bennett et al. | |
| 9,381,895 B1 | 7/2016 | Smathers | |
| 9,533,540 B2 | 1/2017 | Lindsay | |
| 10,118,597 B2 | 11/2018 | Taneyhill et al. | |
| 10,207,694 B2 | 2/2019 | Minato | |
| 10,232,859 B2 * | 3/2019 | Theodosiou | B60W 10/10 |
| 2003/0006644 A1 | 1/2003 | Macgregor | |
| 2008/0224532 A1 * | 9/2008 | Morris | B60T 7/12 303/2 |
| 2015/0292615 A1 * | 10/2015 | Shattuck | F16H 61/0202 701/51 |
| 2020/0180585 A1 * | 6/2020 | Barade | B60T 13/686 |
| 2020/0324792 A1 | 10/2020 | Kunihiro et al. | |

OTHER PUBLICATIONS

International Search Report dated Nov. 22, 2022 for Application Serial No. PCT/US2022/036440 (5 pages).
Written Opinion of the International Searching Authority dated Nov. 22, 2022 for Application Serial No. PCT/US2022/036440 (8 pages).

* cited by examiner

ELECTRONIC PARKING BRAKE RELEASE SYSTEM AND METHOD

FIELD OF THE DISCLOSURE

The present disclosure generally relates to braking systems for heavy-duty vehicles and, more particularly, to systems and methods that control a combination of electronics and pneumatics to operate parking brakes and/or emergency brakes of a vehicle.

BACKGROUND

In conventional parking brake systems for air braked vehicles such as for example single chassis commercial vehicles including delivery vehicles, busses, and the like, a dash mounted push/pull air switch is provided for actuation by the driver to selectively set and release the parking brake(s) of the vehicle. By way of example, the driver may pull the dash mounted parking brake switch when he wants to release air thereby setting and/or otherwise engaging the parking brakes of the vehicle. Conversely, the driver may push the dash mounted switch when he wants to supply air thereby releasing and/or otherwise disengaging the parking brakes of the vehicle.

Similarly, in a parking brake system for an air braked combination vehicle including for example one or more trailers towed by a tractor, a set of dash mounted push/pull air switches commonly referred to as "red and yellow" switches are provided for actuation by the driver to selectively set and release the parking brake(s) of the tractor and trailer. The driver pushes a dash mounted tractor park (yellow) switch when he wants to release the parking brake of the tractor. The driver pushes the dash mounted trailer supply (red) switch when he wants to supply air to the trailer. Supplying air to the trailer will release the parking brakes of the trailer. The driver pulls the tractor park switch when he wants to release air from the parking brake actuators to apply the parking brakes of the tractor. The driver pulls the trailer supply switch when he wants to evacuate air from the trailer air supply to apply the parking brakes of the trailer. In a multi-function valve, such as the MV-3TM dash control module from Bendix Commercial Vehicle Systems LLC, the supply air to the trailer is automatically evacuated when the air is released from the parking brake actuators of the tractor. Therefore, through use of such a multi-function valve, the parking brakes of the trailer are applied at approximately the same time as the tractor.

These pneumatic push-pull valves are usually placed within the vehicle's instrument panel, as are the pneumatic lines and connectors used to connect the brake control valves to the other components of the vehicle's air brake system. Dash mounting of these components may decrease pneumatic performance while consuming critical space in the vehicle's instrument panel which may ultimately result in dash configurations that are detrimental to the driver's comfort and convenience. Furthermore, installation of the pneumatic instrument panel controls requires complex, airtight connections during the final assembly phase of the vehicle.

Accordingly, electronic park brake control systems in commercial vehicles have begun to replace the conventional mechanical dash mounted push/pull air switches. Such systems typically include an electro-mechanical switch assembly mounted on or in the instrument panel at a user interface, often referred to as the human-machine interface (HMI), for controlling the parking brakes with an electrically responsive valve located remotely from the dash components. Such electronic park brake switch assemblies are preferred over air brake parking systems that require an air valve and pneumatic tubing in the dashboard of the vehicle to actuate the park brake. Adoption and use of electronic park brake controls by vehicle operators is eased in that they often have a similar HMI appearance to the conventional mechanical controls, and therefore can be operated intuitively and efficiently.

One such electronic park brake control system is the Intellipark® system available from Bendix Commercial Vehicle Systems LLC. The Intellipark® system is compatible for use with almost any air-braked vehicle including for example tractor-trailers, single-unit trucks, motorcoaches, school buses, and the like. The Intellipark® electronic park brake control system uses ergonomic, easy-to-apply electronic switches that replace the conventional red and yellow push/pull knobs, leading to ease of adoption and use resulting in increased driver satisfaction.

The Intellipark® system replaces the conventional manual air parking brake buttons with easy-to-apply electronic switches that are operatively coupled with a Dash Electronic Control Unit (DECU), and a Park Valve Module (PVM) portion of the system located out of sight of the driver equipped with valves and latching solenoids to ensure a safe vehicle state even with power loss. The Intellipark® system can automatically set the parking brake if the driver exits the vehicle without himself/herself setting the parking brake. In this regard a series of interlocks including for example an interlock based on a door switch input signal, a seat belt input signal, and a vehicle speed signal is used to automatically set the parking brake on the vehicle including a trailer if so equipped, should the driver forget to do so. These interlocks give Intellipark® system the ability to intervene when a driver exits the vehicle without setting the parking brake. Once set, the vehicle parking brake is held in that state until a particular set of release interlocks are satisfied such as, for example, the driver must be buckled, the brake pedal must be depressed, and the door must be closed before the parking brake is permitted to release in reply to actuation by the driver of one or more of the dash mounted electronic switches.

Situations may occur, however, where one or more of the devices providing the particular set of release interlock input signals to the DECU fail or are corrupted thereby preventing the transition of the parking brake from a set or engaged state to a released or disengaged state. By way of example, a switch that generates a signal representative of a door of the vehicle being closed such as for example a school bus door switch, may malfunction thereby causing the particular set of release interlocks to remain unsatisfied at the DECU, even though the door may be physically closed in fact.

It may be desirable therefore to provide a bypass for causing the parking brake of the vehicle to release even if the standard set of routine or otherwise standard release interlocks are not satisfied at the DECU.

It may be desirable therefore to provide an override for causing the parking brake of the vehicle to release even if the standard set of routine or otherwise standard release interlocks are not satisfied at the DECU.

SUMMARY

These and other disadvantages of the conventional systems are overcome by the systems and methods disclosed herein, which provides systems and methods for controlling the release of a parking brake system of an associated vehicle. The exemplary embodiments shown in the Figures herein are operable with a series of electrically controlled valves that are used to operate one or more pneumatic latching valves to apply or release a vehicle's parking brakes. Thus, the systems and methods disclosed herein may include electrical components, electronic components, electro-mechanical components, software, firmware, and/or pneumatic components.

In accordance with an aspect, an apparatus is provided for controlling release of a parking brake of a parking brake system of an associated vehicle. The apparatus in accordance with an example includes an electronic control system including a non-transient memory device, parking brake control logic stored in the non-transient memory device, and a processor operably coupled with the non-transient memory device. The processor is operable to execute the parking brake control logic to selectively generate a parking brake release (PBR) signal based on receiving a set of predetermined PBR interlock override signals in an absence of receiving fully all of a set of predetermined PBR interlock standard satisfaction signals. In accordance with an aspect, receiving fully all of the set of predetermined PBR interlock standard satisfaction signals causes the processor executing the parking brake control logic to generate the PBR signal, wherein the set of predetermined PBR interlock override signals is different than the set of predetermined PBR interlock standard satisfaction signals, and wherein the PBR signal is deliverable for use by the associated vehicle to effect the release of the parking brake of the parking brake system of the associated vehicle.

The electro-pneumatic latching valves described in the present disclosure typically include a switch unit having an electric "apply" or "activate" switch, a "release" or "deactivate" switch, and a power supply. An electro-pneumatic latching valve unit may include a first valve in electrical communication with an activate switch and a second valve in electrical communication with a deactivate switch. A third valve such as for example a pneumatic latching valve is in pneumatic communication with the first and second valves. A source of pressurized air is in pneumatic communication with all three valves in each valve unit. The first and second valves deliver control air to the latching valve in response to either an electric "apply" signal or an electric "release" signal and the latching valve opens or closes in response to these signals. A terminal device, such as a spring brake, is in pneumatic communication with the latching valve and is released in response to pressurized supply air delivered to the device through the open latching valve. The device is applied when the latching valve closes and the pressurized supply air is exhausted from the device through the latching valve.

In accordance with an aspect of the disclosure, an apparatus is provided for controlling release of a parking brake of a parking brake system of an associated vehicle. The apparatus includes an electronic control system that includes a non-transient memory device, parking brake control logic stored in the non-transient memory device, and a processor operably coupled with the non-transient memory device. The processor is operable to execute the parking brake control logic to selectively generate a parking brake release (PBR) signal. The PBR signal is selectively generated based on the electronic control system receiving a set of predetermined PBR interlock override signals in an absence of receiving fully all of a set of predetermined PBR interlock standard satisfaction signals, wherein receiving fully all of the set of predetermined PBR interlock standard satisfaction signals causes the processor executing the parking brake control logic to generate the PBR signal, and wherein the set of predetermined PBR interlock override signals is different than the set of predetermined PBR interlock standard satisfaction signals. In accordance with the aspect of the disclosure, the PBR signal is deliverable for use by the associated vehicle to effect the release of the parking brake of the parking brake system of the associated vehicle.

In accordance with the aspect of the disclosure, the PBR signal is generated under normal conditions based on the electronic control system receiving fully all of the set of predetermined PBR interlock standard satisfaction signals. In that way, the parking brake can be released normally. In an embodiment, receiving fully all of the set of predetermined PBR interlock standard satisfaction signals causes the processor executing the parking brake control logic to generate the PBR signal. However, upon failure of any one or more devices generating the set of predetermined PBR interlock standard satisfaction signals, or under other conditions where it is desirable to release the parking brake of associated vehicle even without receiving the full set of predetermined PBR interlock standard satisfaction signals, the PBR signal is selectively generated based on the electronic control system receiving the set of predetermined PBR interlock override signals in the absence of receiving fully all of the set of predetermined PBR interlock standard satisfaction signals, wherein the set of predetermined PBR interlock override signals is different than the set of predetermined PBR interlock standard satisfaction signals.

In any of the embodiments of the apparatus controlling the release of a parking brake of a parking brake system of an associated vehicle herein, the processor is operable to execute the parking brake control logic to selectively generate the PBR signal based on the electronic control system receiving the set of predetermined PBR interlock override signals in the absence of receiving fully all of the set of predetermined PBR interlock standard satisfaction signals. In addition, the set of predetermined PBR interlock override signals comprises one or more signals not being a member of the set of predetermined PBR interlock standard satisfaction signals. In further addition, the set of predetermined PBR interlock standard satisfaction signals comprises one or more signals not being a member of the set of predetermined PBR interlock override signals.

In any of the embodiments of the apparatus controlling the release of a parking brake of a parking brake system of an associated vehicle herein, the processor is operable to execute the parking brake control logic to selectively generate the PBR signal based on the electronic control system receiving the set of predetermined PBR interlock override signals in the absence of receiving fully all of the set of predetermined PBR interlock standard satisfaction signals. In addition, the set of predetermined PBR interlock override signals comprises a set of predetermined operator PBR interlock override request signals representative of a PBR interlock override request received from an operator of the associated vehicle, and a set of predetermined vehicle PBR override operating condition signals representative of one or more operating conditions of the associated vehicle disposed in a PBR interlock override posture by the operator. In further addition, the set of predetermined PBR interlock standard satisfaction signals comprises a set of predetermined operator PBR interlock standard satisfaction request signals representative of a PBR interlock standard satisfaction request received from the operator of the associated vehicle, and a set of predetermined vehicle PBR standard operating condition signals representative of one or more operating conditions of the associated vehicle disposed in a PBR interlock standard satisfaction posture by the operator.

In any of the embodiments of the apparatus controlling the release of a parking brake of a parking brake system of an associated vehicle herein, the processor is operable to execute the parking brake control logic to generate the PBR signal based on the electronic control system receiving the set of predetermined operator PBR interlock standard satisfaction request signals, and the electronic control system receiving the set of predetermined vehicle PBR standard operating condition signals. In any of the embodiments the set of predetermined operator PBR interlock standard satisfaction request signals comprises one or more of a service brake pedal actuated signal representative of a service brake pedal being actuated by the operator of the associated vehicle, and/or an instrument panel switch signal representative of a switch on an instrument panel of the associated vehicle being actuated by the operator. In any of the embodiments the set of predetermined vehicle PBR standard operating condition signals comprise one or more of an ignition ON signal representative of an ignition of the associated vehicle being in an active state, an engine running signal represented of an operating condition of an engine of the associated vehicle, a transmission engaged signal representative of a shift protocol of a transmission of the associated vehicle being competed, and/or one or more vehicle operational readiness signals representative of a readiness of operation of the associated vehicle by the operator.

In any of the embodiments of the apparatus controlling the release of a parking brake of a parking brake system of an associated vehicle herein, the processor is operable to execute the parking brake control logic to generate the PBR signal based on the electronic control system receiving the set of predetermined operator PBR interlock override request signals, and the electronic control system receiving the set of predetermined vehicle PBR override operating condition signals. In any of the embodiments the set of predetermined operator PBR interlock override request signals comprises one or more of an accelerator pedal actuated signal representative of an accelerator pedal being actuated by the operator of the associated vehicle, and/or an instrument panel switch signal representative of a switch on an instrument panel of the associated vehicle being actuated by the operator. In any of the embodiments the set of predetermined vehicle PBR override operating condition signals comprises one or more of an ignition ON signal representative of an ignition of the associated vehicle being in an active state, an engine running signal represented of an operating condition of an engine of the associated vehicle, and/or a transmission engaged signal representative of a shift protocol of a transmission of the associated vehicle being competed.

In any of the embodiments of the apparatus controlling the release of a parking brake of a parking brake system of an associated vehicle herein, the processor is operable to execute the parking brake control logic to generate the PBR signal based on the electronic control system receiving the set of predetermined operator PBR interlock override request signals, and the electronic control system receiving the set of predetermined vehicle PBR override operating condition signals. In any of the embodiments the set of predetermined operator PBR interlock override request signals comprises one or more of an accelerator pedal actuated signal representative of an accelerator pedal being actuated by the operator of the associated vehicle, and/or an instrument panel switch signal representative of a switch on an instrument panel of the associated vehicle being actuated by the operator. In any of the embodiments the set of predetermined vehicle PBR override operating condition signals comprises one or more of an ignition ON signal representative of an ignition of the associated vehicle being in an active state, an engine running signal represented of an operating condition of an engine of the associated vehicle, and/or a transmission engaged signal representative of a shift protocol of a transmission of the associated vehicle being competed.

In any of the embodiments of the apparatus controlling the release of a parking brake of a parking brake system of an associated vehicle herein, the processor is operable to execute the parking brake control logic to generate the PBR signal based on the electronic control system receiving the sets of predetermined operator PBR interlock override request and vehicle PBR override operating condition signals. In addition, in any of the embodiments herein, the processor is operable to execute the parking brake control logic to sustain generating the PBR signal in an absence of the electronic control system receiving the instrument panel switch signal based on the electronic control system receiving a vehicle speed signal representative of a moving speed of the associated vehicle, and the electronic control system determining the vehicle speed signal being above a predetermined override speed increasing latch value stored in the non-transient memory device.

In any of the embodiments of the apparatus controlling the release of a parking brake of a parking brake system of an associated vehicle herein, the processor is operable to execute the parking brake control logic to cease generating the PBR signal in the absence of the electronic control system receiving the instrument panel switch signal based on the electronic control system determining the vehicle speed signal being below a predetermined override speed decreasing latch value stored in the non-transient memory device, wherein the predetermined override speed decreasing latch value is less than the predetermined override speed increasing latch value.

In accordance with an aspect of the disclosure, a method is provided for controlling release of a parking brake of a parking brake system of an associated vehicle. The method includes storing parking brake control logic in a non-transient memory device of an electronic control system of an apparatus, and executing the parking brake control logic by a processor operatively coupled with the non-transient memory device to selectively generate a parking brake release (PBR) signal. The PBR signal is selectively generated based on the electronic control system of the apparatus receiving a set of predetermined PBR interlock override signals in an absence of receiving fully all of a set of predetermined PBR interlock standard satisfaction signals, wherein receiving fully all of the set of predetermined PBR interlock standard satisfaction signals causes the processor executing the parking brake control logic to generate the PBR signal, and wherein the set of predetermined PBR interlock override signals is different than the set of predetermined PBR interlock standard satisfaction signals. In accordance with an aspect of the disclosure, the PBR signal is deliverable for use by the associated vehicle to effect the release of the parking brake of the parking brake system of the associated vehicle.

In accordance with the aspect of the disclosure, the PBR signal is generated in accordance with the method under normal conditions based on the electronic control system receiving fully all of the set of predetermined PBR interlock standard satisfaction signals. In that way, the parking brake can be released normally. In an embodiment of the method, receiving fully all of the set of predetermined PBR interlock standard satisfaction signals causes the processor executing the parking brake control logic to generate the PBR signal. However, upon failure of any one or more devices generating the set of predetermined PBR interlock standard satisfaction signals, or under other conditions where it is desirable to release the parking brake of associated vehicle even without receiving the full set of predetermined PBR interlock standard satisfaction signals, the PBR signal is selectively generated based on the electronic control system receiving the set of predetermined PBR interlock override signals in the absence of receiving fully all of the set of predetermined PBR interlock standard satisfaction signals, wherein the set of predetermined PBR interlock override signals is different than the set of predetermined PBR interlock standard satisfaction signals.

In any of the embodiments of the method controlling the release of a parking brake of a parking brake system of an associated vehicle herein, the parking brake control logic is executed by the processor to selectively generate the PBR signal to selectively generate the PBR signal based on the electronic control system receiving the set of predetermined PBR interlock override signals comprising one or more signals not being a member of the set of predetermined PBR interlock standard satisfaction signals in the absence of receiving fully all of the set of predetermined PBR interlock standard satisfaction signals comprising one or more signals not being a member of the set of predetermined PBR interlock override signals.

In any of the embodiments of the method controlling the release of a parking brake of a parking brake system of an associated vehicle herein, the parking brake control logic is executed by the processor to selectively generate the PBR signal based on the electronic control system receiving the set of predetermined PBR interlock override signals in the absence of receiving fully all of the set of predetermined PBR interlock standard satisfaction signals. In any of the embodiments of the method herein, the receiving the set of predetermined PBR interlock override signals comprises receiving one or more of a set of predetermined operator PBR interlock override request signals representative of a PBR interlock override request received from an operator of the associated vehicle, and/or a set of predetermined vehicle PBR override operating condition signals representative of one or more operating conditions of the associated vehicle disposed in a PBR interlock override posture by the operator. In any of the embodiments of the method herein, the receiving the set of predetermined PBR interlock standard satisfaction signals comprises receiving one or more of a set of predetermined operator PBR interlock standard satisfaction request signals representative of a PBR interlock standard satisfaction request received from the operator of the associated vehicle, and/or a set of predetermined vehicle PBR standard operating condition signals representative of one or more operating conditions of the associated vehicle disposed in a PBR interlock standard satisfaction posture by the operator.

In any of the embodiments of the method controlling the release of a parking brake of a parking brake system of an associated vehicle herein, the parking brake control logic is executed by the processor to selectively generate the PBR signal based on the electronic control system receiving the set of predetermined operator PBR interlock standard satisfaction request signals, and the set of predetermined vehicle PBR standard operating condition signals. In any of the embodiments of the method herein, the receiving the set of predetermined operator PBR interlock standard satisfaction request signals comprises receiving one or more of a service brake pedal actuated signal representative of a service brake pedal being actuated by the operator of the associated vehicle, and/or an instrument panel switch signal representative of a switch on an instrument panel of the associated vehicle being actuated by the operator. In any of the embodiments of the method herein, the receiving the set of predetermined vehicle PBR standard operating condition signals comprises receiving one or more of an ignition ON signal representative of an ignition of the associated vehicle being in an active state, an engine running signal represented of an operating condition of an engine of the associated vehicle, a transmission engaged signal representative of a shift protocol of a transmission of the associated vehicle being competed, and/or one or more vehicle operational readiness signals representative of a readiness of operation of the associated vehicle by the operator.

In any of the embodiments of the method controlling the release of a parking brake of a parking brake system of an associated vehicle herein, the parking brake control logic is executed by the processor to selectively generate the PBR signal based on the electronic control system receiving the set of predetermined operator PBR interlock override request signals, and the set of predetermined vehicle PBR override operating condition signals. In any of the embodiments of the method herein, the receiving the set of predetermined operator PBR interlock override request signals comprises receiving one or more of an accelerator pedal actuated signal representative of an accelerator pedal being actuated by the operator of the associated vehicle, and/or an instrument panel switch signal representative of a switch on an instrument panel of the associated vehicle being actuated by the operator. In any of the embodiments of the method herein, the receiving the set the electronic control system comprises receiving one or more of an ignition ON signal representative of an ignition of the associated vehicle being in an active state, an engine running signal represented of an operating condition of an engine of the associated vehicle, and/or a transmission engaged signal representative of a shift protocol of a transmission of the associated vehicle being competed.

In any of the embodiments of the method controlling the release of a parking brake of a parking brake system of an associated vehicle herein, the parking brake control logic is executed by the processor to selectively generate the PBR signal based on the electronic control system receiving the set of predetermined operator PBR interlock override request signals, and the set of predetermined vehicle PBR override operating condition signals. In any of the embodiments of the method herein, the receiving the set of predetermined operator PBR interlock override request signals comprises receiving one or more of an accelerator pedal actuated signal representative of an accelerator pedal being actuated by the operator of the associated vehicle, and/or an instrument panel switch signal representative of a switch on an instrument panel of the associated vehicle being actuated by the operator. In any of the embodiments of the method herein, the receiving the set of predetermined vehicle PBR override operating condition signals comprises receiving one or more of an ignition ON signal representative of an ignition of the associated vehicle being in an active state, an engine running signal represented of an operating condition of an engine of the associated vehicle, and/or a transmission engaged signal representative of a shift protocol of a transmission of the associated vehicle being competed.

In any of the embodiments of the method controlling the release of a parking brake of a parking brake system of an associated vehicle herein, the method further comprises sustaining generating the PBR signal in an absence of the electronic control system receiving the instrument panel switch signal based on the electronic control system receiving a vehicle speed signal representative of a moving speed of the associated vehicle, and the electronic control system determining the vehicle speed signal being above a predetermined override speed increasing latch value stored in the non-transient memory device.

In any of the embodiments of the method controlling the release of a parking brake of a parking brake system of an associated vehicle herein, the method further comprises ceasing generating the PBR signal in the absence of the electronic control system receiving the instrument panel switch signal based on the electronic control system determining the vehicle speed signal being below a predetermined override speed decreasing latch value stored in the non-transient memory device, wherein the predetermined override speed decreasing latch value is less than the predetermined override speed increasing latch value.

In accordance with an aspect of the disclosure, a computer readable medium is provided storing instructions thereon that are executable by a processor to perform a method for controlling release of a parking brake of a parking brake system of an associated vehicle. The method includes selectively generating a parking brake release (PBR) signal based on receiving a set of predetermined PBR interlock override signals in an absence of receiving fully all of a set of predetermined PBR interlock standard satisfaction signals, wherein receiving fully all of the set of predetermined PBR interlock standard satisfaction signals causes the processor executing the parking brake control logic to generate the PBR signal, and wherein the set of predetermined PBR interlock override signals is different than the set of predetermined PBR interlock standard satisfaction signals. In accordance with an aspect of the disclosure, the PBR signal is deliverable for use by the associated vehicle to effect the release of the parking brake of the parking brake system of the associated vehicle.

In any of the embodiments of the computer readable medium, the selectively generating the PBR signal based on receiving the set of predetermined PBR interlock override signals in the absence of receiving fully all of the set of predetermined PBR interlock standard satisfaction signals comprises selectively generating the PBR signal based on receiving the set of predetermined PBR interlock override signals in the absence of receiving fully all of the set of predetermined PBR interlock standard satisfaction signals, wherein the set of predetermined PBR interlock override signals comprise one or more of a set of predetermined operator PBR interlock override request signals representative of a PBR interlock override request received from an operator of the associated vehicle, and/or a set of predetermined vehicle PBR override operating condition signals representative of one or more operating conditions of the associated vehicle disposed in a PBR interlock override posture by the operator, and wherein the set of predetermined PBR interlock standard satisfaction signals comprise one or more of a set of predetermined operator PBR interlock standard satisfaction request signals representative of a PBR interlock standard satisfaction request received from the operator of the associated vehicle, and/or a set of predetermined vehicle PBR standard operating condition signals representative of one or more operating conditions of the associated vehicle disposed in a PBR interlock standard satisfaction posture by the operator.

In any of the embodiments of the computer readable medium, the selectively generating the PBR signal comprises selectively generating the PBR signal based on receiving the set of predetermined operator PBR interlock standard satisfaction request signals, and the set of predetermined vehicle PBR standard operating condition signals. In any of the embodiments of the computer readable medium, the set of predetermined operator PBR interlock standard satisfaction request signals comprises one or more of a service brake pedal actuated signal representative of a service brake pedal being actuated by the operator of the associated vehicle, and/or an instrument panel switch signal representative of a switch on an instrument panel of the associated vehicle being actuated by the operator. In any of the embodiments of the computer readable medium, the set of predetermined vehicle PBR standard operating condition signals comprises one or more of an ignition ON signal representative of an ignition of the associated vehicle being in an active state, an engine running signal represented of an operating condition of an engine of the associated vehicle, a transmission engaged signal representative of a shift protocol of a transmission of the associated vehicle being competed, and/or one or more vehicle operational readiness signals representative of a readiness of operation of the associated vehicle by the operator.

In any of the embodiments of the computer readable medium, the selectively generating the PBR signal comprises selectively generating the PBR signal based on receiving the set of predetermined operator PBR interlock override request signals, and the set of predetermined vehicle PBR override operating condition signals. In any of the embodiments of the computer readable medium, the set of predetermined operator PBR interlock override request signals comprises one or more of an accelerator pedal actuated signal representative of an accelerator pedal being actuated by the operator of the associated vehicle, and/or an instrument panel switch signal representative of a switch on an instrument panel of the associated vehicle being actuated by the operator. In any of the embodiments of the computer readable medium, the set of predetermined vehicle PBR override operating condition signals comprises one or more of an ignition ON signal representative of an ignition of the associated vehicle being in an active state, an engine running signal represented of an operating condition of an engine of the associated vehicle, and/or a transmission engaged signal representative of a shift protocol of a transmission of the associated vehicle being competed.

BRIEF DESCRIPTION OF THE DRAWINGS

The accompanying drawings, which are incorporated into and form a part of the specification, schematically illustrate one or more exemplary embodiments and, together with the general description given above and detailed description given below, serve to explain the general principles of the disclosure.

DETAILED DESCRIPTION

The example embodiments described herein provide an apparatus and method for use in controlling release of a parking brake of a parking brake system of an associated vehicle. The exemplary embodiments may utilize a series of electrically controlled valves that are in turn used to operate at least one pneumatic latching valve to apply or release a vehicle's parking brakes. Thus, the logic of the system and method of the present disclosure includes both electrical and pneumatic components. The electrically controlled valves, which in the exemplary embodiments may be solenoid valves for example, that are used only to induce a "change of state" in the vehicle's parking brakes, as described below. With reference to the Figures in general, a series of small capital letters are used to designate the ports of the various valves included in the system of the present invention. The letter "S" refers to "supply," the letter "C" refers to "control," the letter "D" refers to "delivery," and the letter "E," refers to "exhaust." In the context of this invention, control air is used as a pneumatic signal that opens or closes a latching valve, while supply air is used to apply or release a terminal device such as a spring brake.

Figure 1:
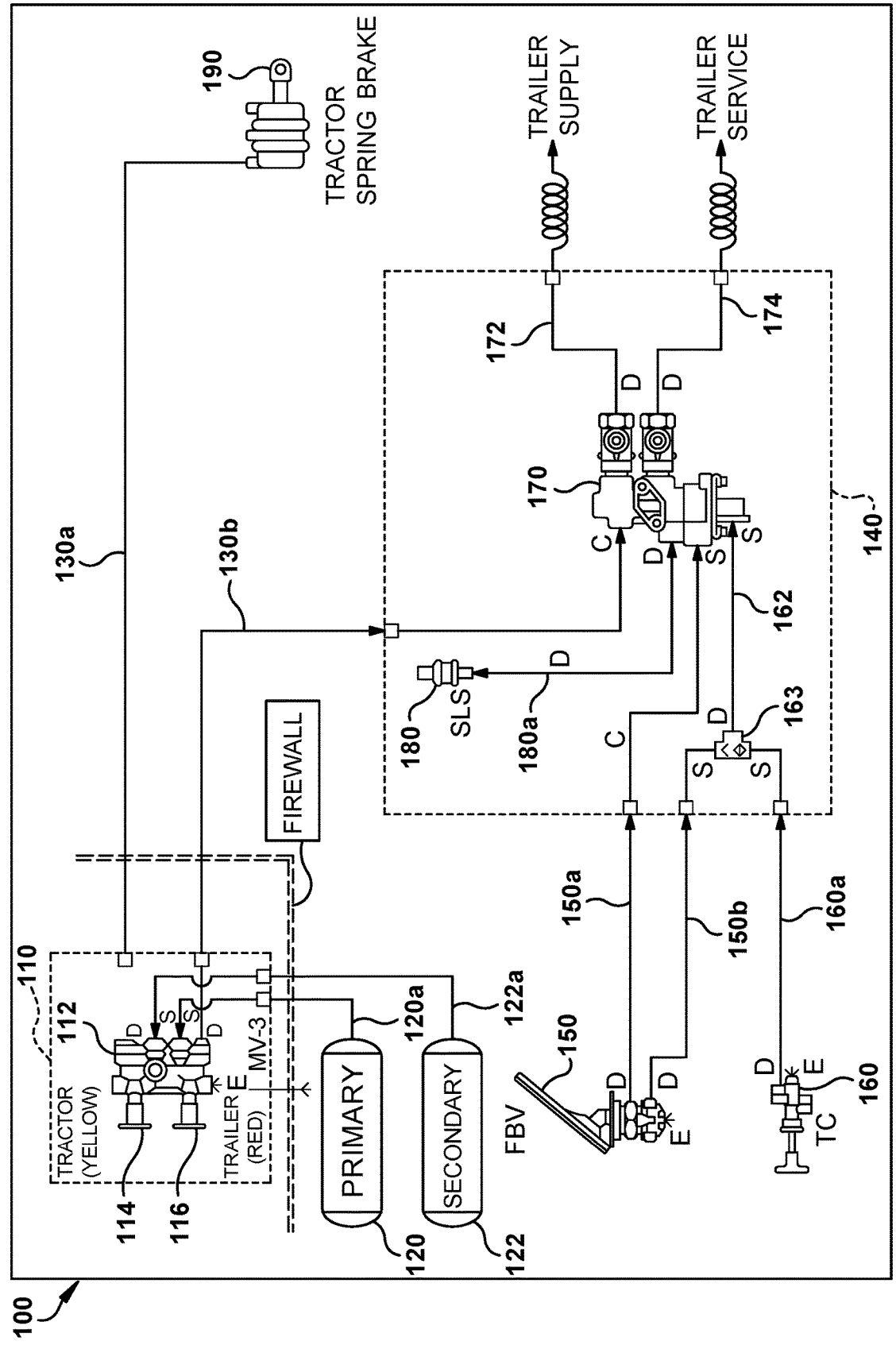
FIG. 1 is a schematic representation of a conventional air brake system that utilizes pneumatics solely to operate the braking system of a vehicle.

To distinguish the characteristics of the example embodiments from conventional pneumatic systems, FIG. 1 provides a partial schematic representation of an air brake system 100 that utilizes pneumatic circuits exclusively. In FIG. 1, all lines depicted in the drawing are pneumatic lines with no electrical circuits being present. The dashboard module 110 includes five (5) pneumatic lines of ⅜ inch diameter and several feet in length. These components are present in the vehicle's cab and traverse the firewall between the cab and the exterior portion of the vehicle.

Primary reservoir air reservoir 120 and secondary air reservoir 122 supply pressurized air to the parking control valve unit 112 by way of supply lines 120a and 122a. Dash valve 114 represents the "yellow button" as it is referred to by those skilled in the art, and includes a combination park pneumatic push-pull plunger. Dash valve 116 represents the "red button" as it is referred to by those skilled in the art, and includes a trailer park control and air supply pneumatic push-pull plunger. The pneumatic logic present in this system enables buttons 114 and 116 to "pop" out automatically in the event the air reservoirs fail and fall below a prescribed pressure, such as, for example, about 40 psi for valve 116 (red) and about 20 psi for valve 114 (yellow).

Delivery line 130a supplies pressurized air to spring brake 190, while trailer supply line 130b supplies pressurized air to tractor protection module 140 and tractor protection valve 170. By way of primary delivery line 150a or secondary delivery line 150b, foot brake valve 150 delivers pressurized air to valve 170 directly or through double check valve 163. Likewise, trailer control valve 160 delivers pressurized air to valve 170 by way of delivery lines 160a and 162. Tractor protection valve 170 may include a service line quick release valve and supply line quick release valve and delivers pressurized air to trailer supply line 172 and trailer service line 174 as well as stop light switch 180 by way of delivery line 180a.

Figure 2:
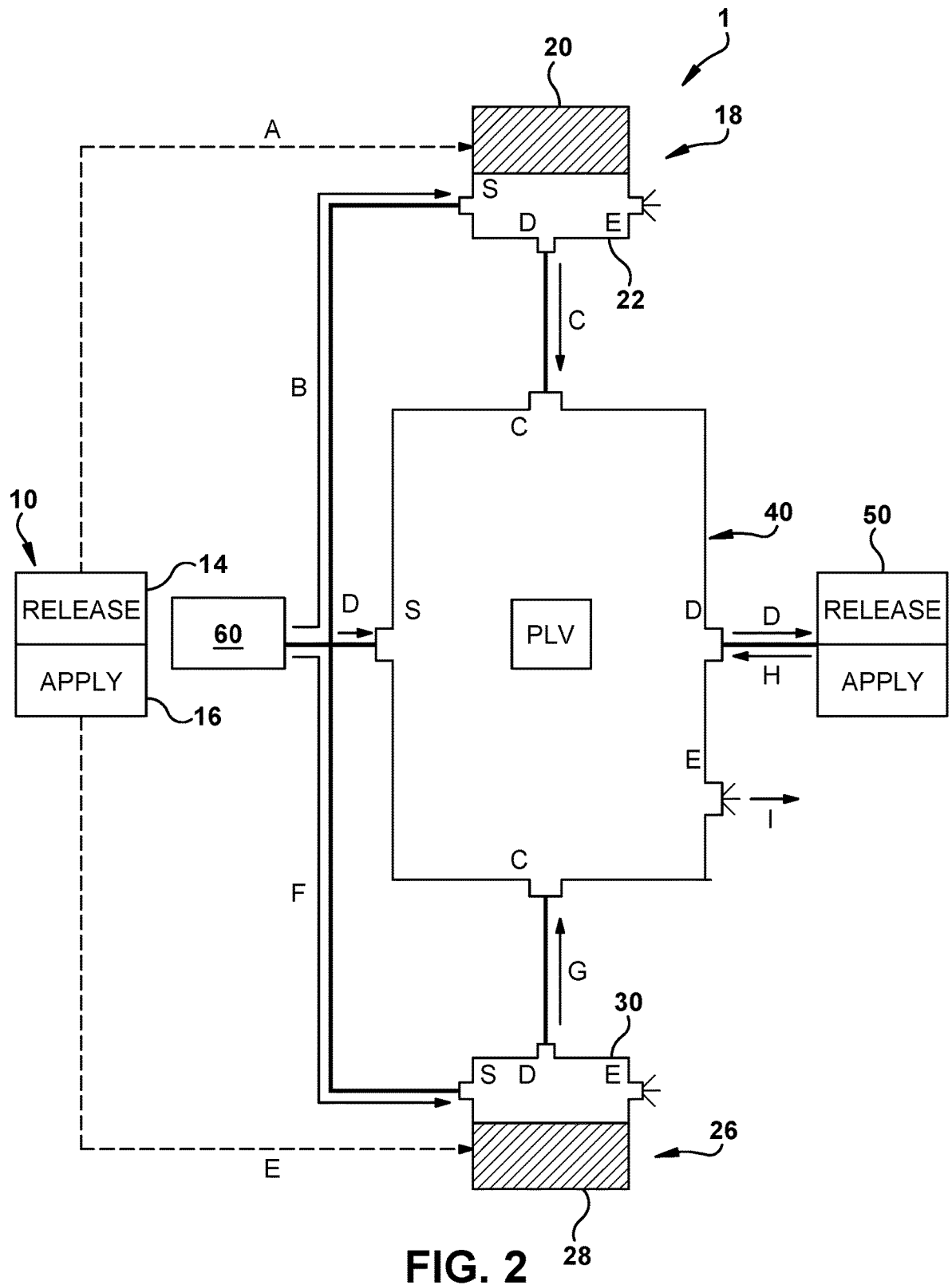
FIG. 2 is a block diagram showing a parking brake system in accordance with an example embodiment.

With reference to FIG. 2, an exemplary embodiment of an electro-pneumatic latching valve system 1 is shown in schematic form. As shown, the electro-pneumatic latching valve system 1 includes an electronic parking brake (EPB) control apparatus 10 for controlling application and/or release of a parking brake of a parking brake system of an associated vehicle. The electro-pneumatic latching valve system 1 further includes a first electric control valve 18, a second electric control valve 26, and a pneumatic latching valve 40. A terminal device 50, and an air reservoir 60 are also included in the exemplary embodiment. The two operational modes of the electric valves which may be solenoid valves are null or closed, and energized or delivery. The pneumatically latching valve possesses the same two operational modes although its input is pneumatic pressure, not solenoid current. The description of the exemplary embodiment refers to the electric control valves as solenoid valves; however, other electrically controllable valves or pneumatic valves may be used to control the operation of the pneumatically latching valve including, but not limited to piezo-electric valves and micro machine valves.

In FIG. 2, a series of electrical lines connects the switch unit to the electric valves, and a plurality of pneumatic lines connects the air reservoir to the electric valves, the latching valve, and the terminal device. Pressurized air is delivered from reservoir 60 to the supply ports of valves 18 and 26 (see arrows B and F) and to the supply port of pneumatic latching valve 40 (see arrow D). This "black air" remains deadheaded at these ports until the operator of the vehicle actuates one of the switches in the apparatus 10. Although not shown with particularity in FIG. 2, an electronic control unit (ECU) 70 (FIG. 5) in the form of a printed circuit board or similar device may be placed within the apparatus 10 or in-line or between the apparatus 10 and the solenoid assemblies for the purposes of integrating additional functionality into the system.

In the exemplary embodiment shown in the Figures, terminal device 50 is a spring brake actuator that utilizes pressurized air to apply or release the parking brakes of a vehicle. With reference to FIG. 2, if the operator desires to release, i.e., deactivate, the parking brakes, release switch 14 is actuated. Upon actuation of the release switch and under the supervision and control of parking brake control logic executed in the apparatus in accordance with the example embodiments to be described in greater detail herein, electric current travels from release switch 14 to release valve 20 (see arrow A). In response to the electrical signal received at release valve 20, the delivery port of solenoid valve 22 is opened and pressurized air is delivered to the top control port of pneumatic latching valve 40 (see arrow C). Upon receiving this pneumatic signal, the piston within latching valve 40 moves from its closed state and the supply port of valve 40 is opened allowing pressurized air to pass through to the delivery port of the valve and into the spring brake, i.e., terminal device 50 (see arrow D). The pressurized air forces the spring within the brake chamber to retract and the vehicle's parking brakes are released allowing the vehicle to move.

When the operator releases switch 14 and under the supervision and control of parking brake control logic executed in the apparatus in accordance with the example embodiments to be described in greater detail herein, valve 22 closes and airflow through the valve ceases. Pressurized air that was delivered to the control port of pneumatic latching valve 40 is exhausted through the exhaust port of solenoid valve 22. Although solenoid valve 22 is closed, and there is no air passing though the valve, the parking brakes of the vehicle remain released because pressurized supply air is still being delivered from reservoir 60 to the spring brake. Thus, valve 40 is referred to as a pneumatic "latching" valve because continuous current to the release valve is not required for the system to maintain continuous air flow to the terminal device. This aspect is particularly advantageous over prior art systems because loss of electrical power or connectivity to the parking brake system does not automatically result in the application of the vehicle's parking brakes.

Again with reference to FIG. 2 if the operator desires to apply, i.e., activate, the parking brakes, apply switch 16 is actuated. Upon actuation of the apply switch 16 and under the supervision and control of parking brake control logic executed in the apparatus in accordance with the example embodiments to be described in greater detail herein, electric current travels from apply switch 16 to apply valve 28 (see arrow E). In response to the electrical signal received at apply valve 28, the delivery port of solenoid valve 30 is opened and pressurized air is delivered to the bottom control port of pneumatic latching valve 40 (see arrow G). Upon receiving this pneumatic signal, the piston within valve 40 returns to its closed state, terminating the flow of pressurized air through the valve to the delivery port and into the spring brake, i.e., terminal device 50. The exhaust port of pneumatic latching valve 40 then opens and air from the spring brake actuator is exhausted to the atmosphere (see arrows H and I). Exhausting the pressurized air in this manner causes the spring within the brake chamber to return to its normal bias and the vehicle's parking brakes are applied.

When the operator releases switch 16 and under the supervision and control of parking brake control logic executed in the apparatus in accordance with the example embodiments to be described in greater detail herein, valve 30 closes and airflow through the valve ceases. Pressurized air that was delivered to the control port of pneumatic latching valve 40 is exhausted through the exhaust port of solenoid valve 30. Although solenoid valve 30 is closed, and there is no air passing though the valve, the parking brakes of the vehicle remain applied because no pressurized air is being delivered from reservoir 60 to the spring brake. As stated above, valve 40 is referred to as a pneumatic latching valve because continuous current to the apply solenoid is not required for the system to prevent air flow to the terminal system device. Again, loss of electrical power or connectivity to the parking brake system does not automatically result in a change of state in the vehicle's parking brakes.

Figure 3:
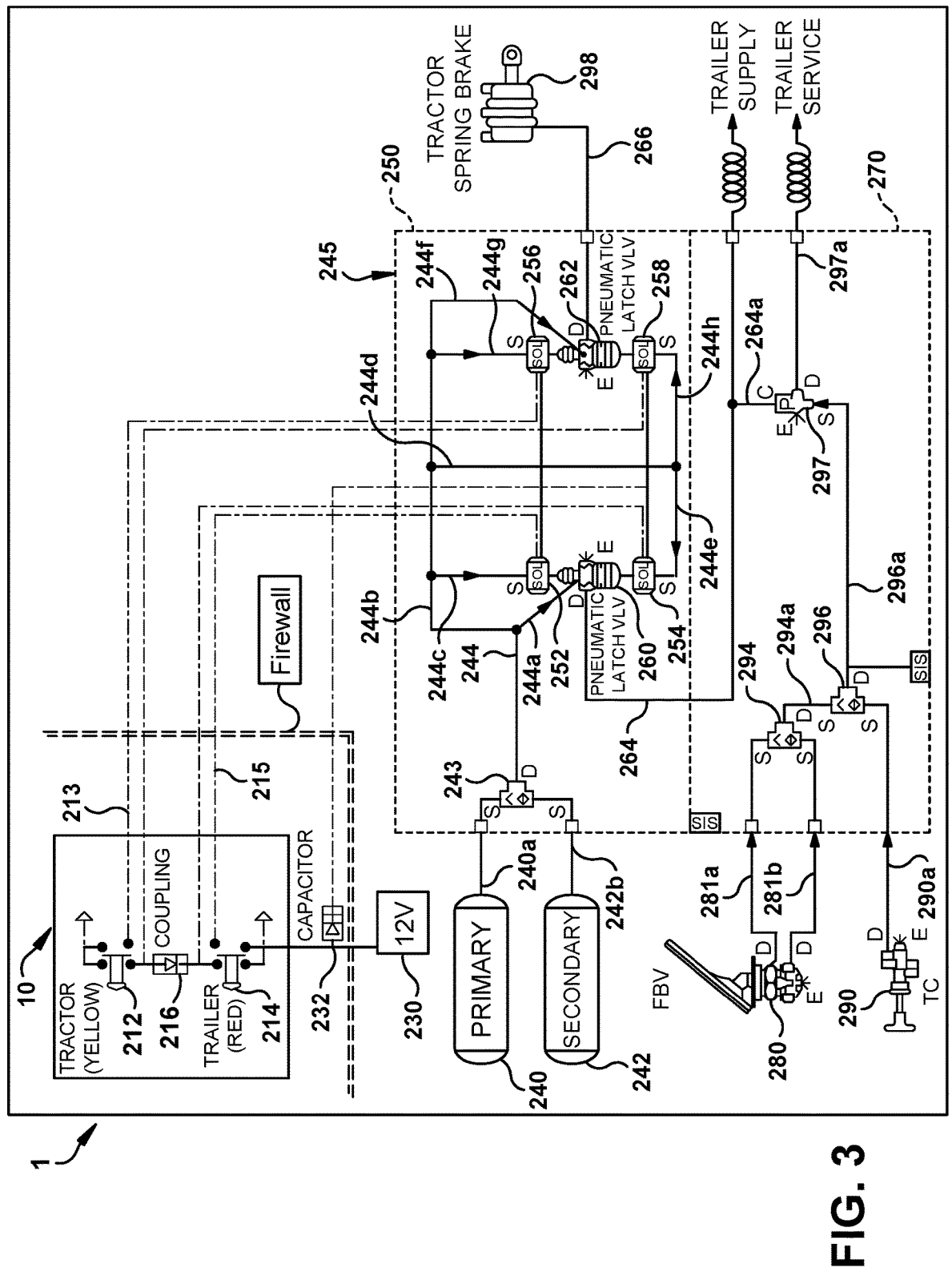
FIG. 3 is a schematic representation of a parking brake system in use with an electro-pneumatic latching valve unit of an example embodiment incorporated into an air brake system for a vehicle having both a tractor portion and a trailer portion.

The electro-pneumatic latching valve system 1 may be incorporated into larger, more complex tractor/trailer brake system. FIG. 3 provides a partial schematic of an exemplary embodiment of brake system 100. This system comprises two basic modules or subsystems: the an electronic parking brake (EPB) control apparatus 10 and a brake control subsystem 245, wherein the an electronic parking brake (EPB) control apparatus 10 includes an electronic control unit (ECU) 70 (FIG. 5) in the form of a printed circuit board or similar device that may be placed within the apparatus 10 or disposed in-line or between the apparatus 10 and the solenoid assemblies for the purposes of integrating additional functionality into the system. Brake control subsystem 245 further includes a remote module 250 and tractor protection module 270. The components of the electronic parking brake (EPB) control apparatus 10 are typically mounted on or within the dashboard of the vehicle, while remote module 250 is typically mounted to an exterior surface of the cab of the vehicle and includes subcomponents that are both internal and external to the cab. The tractor protection module 270 also typically includes subcomponents that are both internal to and external to the cab of the vehicle.

As shown in FIG. 3, the electronic parking brake (EPB) control apparatus 10 comprises tractor and combination park electrical switch unit (the "yellow button") 212 and trailer park and supply electrical switch unit (the "red button") 214. In the exemplary embodiment, these buttons are 2-position, momentary on-off-on, press-pull hinged toggle-type devices that provide the operator with an interface to the vehicle's parking system, and serve as the input devices, which drives electric valves 252, 254, 256, and 258, which in the exemplary embodiment are solenoid valves. These buttons may be backlit 214a, 216a for visibility and may include a status indicator in the form of variable light intensity or an LED. The buttons are lit based either on input from pressure switches or on valve position, which typically includes contacting or non-contacting indicator switches that indicate whether the park brakes are applied or released.

A button coupling diode functionality 216 is provided for example in software logic of the electronic control system 70 between assemblies 212 and 214 and couples the function of the trailer and tractor components of the system. This coupling can be performed logically within the software logic of the electronic control system 70 or by an equivalent device such as an electrical driver circuit that emulates the logic of a diode or may be implemented pneumatically with a check valve placed between the park sides of the yellow and red valves. Typically, the coupling logic utilized by a diode function or other electronics is designed such that operating the park function of the yellow button unit automatically operates the park function of the red button unit. This functionality can be characterized as a "single-button park feature." The electro-pneumatic system of the present invention functions such that if the two status lights on the valve unit are extinguished, then a single pull of the yellow button will pass current to both the yellow and red park solenoids, thus lighting both the red and yellow buttons once the parking action is complete.

In the example embodiment shown in FIG. 3, tractor brake circuit 213 connects yellow button 212 to solenoid valve 256 and solenoid valve 258 and provides an electrical pathway for activating these two solenoids. Likewise, trailer brake circuit 215 connects red button 214 to solenoid valve 252 and solenoid valve 254 and provides an electrical pathway for activating these two solenoids. It should be noted that in the embodiment that includes an electronic control unit circuits 213 and 215 either connect the buttons to the electronic control unit or connect the electronic control unit to the solenoids.

The power for operating circuits 213 and 215 is provided by a power source 230, which is typically a 12V battery, and a capacitor 232 that is in electrical communication with both the electronic parking brake (EPB) control apparatus 10 and brake control subsystem 245. In the event of electrical power loss, capacitor 232 provides energy for at least one additional parking application; thus, the operator may still park the vehicle despite the loss of electrical power to the brake system. A diode or other isolation circuit and/or logical function may be employed to ensure that the capacitor's charge is preserved only for the parking system, and not discharged through the remainder of the vehicle electrical system. In alternate embodiments, a simple capacitor, a complex capacitive circuit, or other suitable means provides backup power. In general, power supply 230 and capacitor 232 comprise primary and secondary power supplies that provide the system with certain protections, conditioning, and backup emergency parking capability.

Figure 3A:
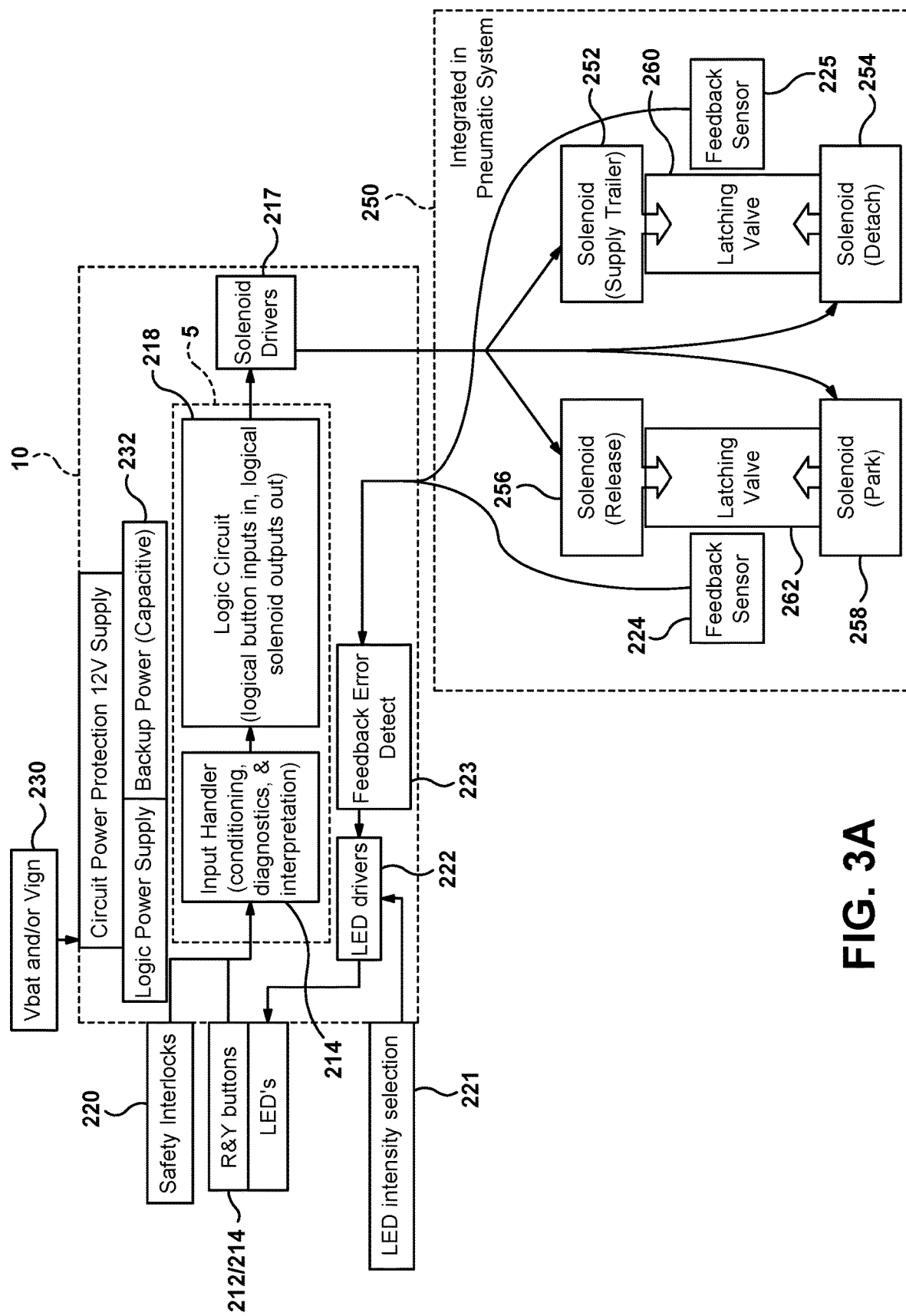
FIG. 3a is a functional block diagram representation of the electro-pneumatic latching valve unit of an example embodiment incorporated into an air brake system for a vehicle having both a tractor portion and a trailer portion.

The embodiment shown in logical form in FIG. 3a includes a printed circuit board that serves as the electronic parking brake (EPB) control apparatus 10 for the brake system. The printed circuit board can be placed in the vehicle's dash or it may be attached to the parking control subsystem. In one embodiment, the brake control subsystem 245 is in an enclosure mounted on the back-of-cab wall, and printed circuit board 211 is mounted on, attached to, or integrated with the parking control subsystem. The printed circuit board may utilize dash buttons with hall effect sensors, and most or all of the support components or modules for the button unit, i.e., buttons 212 and 214, hall sensors, LEDs, LED intensity selection 221, LED drivers 222, feedback error detection 223, feedback sensors 224 and 225, solenoid drivers 217, backup power supply 232, and interlock support/interface 223, is integrated into the printed circuit board. The printed circuit board may also include a microprocessor 5 that includes an input handler module 219 and a logic circuit or module 218.

It is to be appreciated that a number of variations are possible with the system described herein. For example: (i) the solenoids may be assembled as a manifold at the vehicle's firewall such that all electrical connections are on the cab-side of the firewall and all the pneumatic connections are on the engine-side of the firewall; (ii) a time-delay circuit or strategy may be employed such that risk of unintended actuation of the parking brakes is reduced; (iii) the actuators can be any working switch logic, either driver-manipulated (push-pull buttons, flippers, sliders, dials) or coupled to another system (transmission shifter "park" position, for example); (iv) the system can receive additional logic, information, or control from an ABS ECU with the authority to control the brake system by a dedicated network protocol such as CAN; (v) the system may employ a dedicated ECU or the system may receive only advisory information, not command information, from an engine or chassis ECU other than an ABS ECU; (vi) the solenoid control may also be replaced by pneumatic pilot control using pneumatic valves that would emulate the operation of the 3-way/2-position, normally closed solenoids described above, e.g., the self-returning TH-3 (Bendix).

The example embodiment also provides a means for allowing safety interlocks to be integrated into a vehicle's brake system as simple electrical switch inputs. In general, the safety interlocks of the present invention (i) prohibit parking brake release based on information obtained from devices around a vehicle that indicates a safety concern regarding movement of the vehicle; and/or (ii) force the vehicle into park based on information obtained from devices around a vehicle that indicates the driver, upon exiting the vehicle, has forgotten to park the vehicle; and/or (iii) provide a bypass for causing the parking brake of the vehicle to release even if the standard set of release interlocks are not satisfied at the DECU; and/or (iv) provide an override for causing the parking brake of the vehicle to release even if the standard set of release interlocks are not satisfied at the DECU. In the exemplary embodiment, safety interlock and theft deterrence are achieved simply by connecting existing vehicle switches (ignition key, brake light switch, door switch, safety belt switch, etc.) to an optional printed circuit board. The printed circuit board, if included, may be placed in an enclosure and may be located in the dash, integrated with existing buttons, or located on the in-the-cab side of the parking control subsystem.

In accordance with an embodiment, the electronic control system 70 of the electronic parking brake (EPB) control apparatus 10 includes a processor 76 that executes parking brake control logic 74 to selectively generate a parking brake release (PBR) signal to release the parking brake based on the electronic control system 70 receiving fully all of a set of predetermined PBR interlock standard satisfaction signals. In this way, the vehicle parking brake may be held in an engaged state until a particular set of regular or otherwise standard release interlocks are satisfied such as, for example, the driver must be buckled, the brake pedal must be depressed, and the door must be closed before the parking brake is permitted to release in reply to actuation by the driver of one or more of the dash mounted electronic switches.

In accordance with an embodiment, the PBR interlock standard satisfaction signals include: i) operator PBR interlock standard satisfaction request signals; and ii) vehicle PBR standard operating condition signals.

The operator PBR interlock standard satisfaction request signals are in the example representative of a PBR interlock standard satisfaction request received from the operator of the associated vehicle. The PBR interlock standard satisfaction request received from the operator of the associated vehicle may include, for example, a service brake pedal actuated signal representative of a service brake pedal being actuated by the operator of the associated vehicle, and/or an instrument panel switch signal representative of a switch on an instrument panel of the associated vehicle being actuated by the operator.

The vehicle PBR standard operating condition signals are in the example representative of one or more operating conditions of the associated vehicle. The vehicle PBR standard operating condition signals may include, for example, one or more of an ignition ON signal representative of an ignition of the associated vehicle being in an active state, an engine running signal represented of an operating condition of an engine of the associated vehicle, a transmission engaged signal representative of a shift protocol of a transmission of the associated vehicle being competed, and vehicle operational readiness signals representative of a readiness of operation of the associated vehicle by the operator.

In accordance with a further embodiment, the processor of the electronic control system 70 of the electronic parking brake (EPB) control apparatus 10 executes the parking brake control logic to selectively generate a parking brake release (PBR) signal to release the parking brake based on the electronic control system 70 receiving a set of predetermined PBR interlock override signals in an absence of receiving fully all of the set of predetermined PBR interlock standard satisfaction signals. In this way, the parking brake of the vehicle may be released even if the particular set of regular or otherwise standard release interlocks are unsatisfied such as, for example, as may occur when one or more of the devices providing the particular set of release interlock input signals to the DECU fail or are corrupted thereby preventing the transition of the parking brake from a set or engaged state to a released or disengaged state. By way of example, a switch that generates a signal representative of a door of the vehicle being closed such as for example a school bus door switch, may malfunction thereby causing the particular set of release interlocks to remain unsatisfied at the DECU, even though the door may be physically closed in fact. The electronic parking brake (EPB) control apparatus 10 of the example embodiments herein therefore provide an override of the standard or regular PBR protocol for causing the parking brake of the vehicle to release even if the standard set of routine or otherwise standard release interlocks are not satisfied at the DECU. One useful example of this function is to move a school bus having such a malfunctioning switch or the like from an entranceway of a tightly packed bus parking lot to thereby provide an egress pathway to other busses in the lot so that they may attend to their respective routes.

In accordance with an embodiment, the PBR interlock override signals include: i) operator PBR interlock override request signals; and ii) Vehicle PBR override operating condition signals.

The operator PBR interlock override request signals are representative of a PBR interlock override request received from an operator of the associated vehicle. In the example embodiment, the operator PBR interlock override request signals representative of the PBR interlock override request include an accelerator pedal actuated signal representative of an accelerator pedal being actuated by the operator of the associated vehicle, and an instrument panel switch signal representative of a switch on an instrument panel of the associated vehicle being actuated by the operator.

The vehicle PBR override operating condition signals are representative of one or more operating conditions of the associated vehicle disposed in a PBR interlock override posture by the operator. In the example embodiment, the vehicle PBR override operating condition signals are representative of one or more operating conditions of the associated vehicle include an ignition ON signal representative of an ignition of the associated vehicle being in an active state, an engine running signal represented of an operating condition of an engine of the associated vehicle, and a transmission engaged signal representative of a shift protocol of a transmission of the associated vehicle being competed.

In particular and in accordance with an example embodiment and as shown in Table I below, the PBR interlock standard satisfaction signals include: i) operator PBR interlock standard satisfaction request signals; and ii) vehicle PBR standard operating condition signals.

TABLE I

I. PBR interlock standard satisfaction signals
    A. operator PBR interlock standard satisfaction request signals - (representative of a PBR interlock standard satisfaction request received from the operator of the associated vehicle)
        1. service brake pedal actuated signal - (representative of a service brake pedal being actuated by the operator of the associated vehicle)
        2. instrument panel switch signal - (representative of a switch on an instrument panel of the associated vehicle being actuated by the operator)
    B. vehicle PBR standard operating condition signals - (representative of one or more operating conditions of the associated vehicle)
        1. ignition ON signal - (representative of an ignition of the associated vehicle being in an active state)
        2. engine running signal - (represented of an operating condition of an engine of the associated vehicle)

TABLE I-continued 3. transmission engaged signal - (representative of a shift protocol of a transmission of the associated vehicle being competed)
        4. vehicle operational readiness signals - (representative of a readiness of operation of the associated vehicle by the operator)

In particular and in accordance with an example embodiment and as shown in Table II below, the PBR interlock override signals include: i) operator PBR interlock override request signals; and ii) Vehicle PBR override operating condition signals.

TABLE II

II. PBR interlock override signals
    A. Operator PBR interlock override request signals - (representative of a PBR interlock override request received from an operator of the associated vehicle)
        1. accelerator pedal actuated signal - (representative of an accelerator pedal being actuated by the operator of the associated vehicle)
        2. instrument panel switch signal - (representative of a switch on an instrument panel of the associated vehicle being actuated by the operator)
    B. Vehicle PBR override operating condition signals - (representative of one or more operating conditions of the associated vehicle disposed in a PBR interlock override posture by the operator)
        1. ignition ON signal - (representative of an ignition of the associated vehicle being in an active state)
        2. engine running signal - (represented of an operating condition of an engine of the associated vehicle)
        3. transmission engaged signal - (representative of a shift protocol of a transmission of the associated vehicle being competed)

In addition to air brake systems, the electro-pneumatic valve system of the example embodiment is compatible with any number of pneumatic systems in which a change of state is not desirable should electric power to the system or its components be lost. For example, this electro-pneumatic valve system may be used with a variety of pneumatic lift devices, including, but not limited to, powered doors, axle shifters, wheel chair lifts, cherry pickers, and air suspension systems.

With continued reference to FIG. 3a, an exemplary embodiment of remote module 250 further comprises a plurality of electric valves (e.g., solenoid valves), as well as two pneumatically latching valves. Although all four electric valves in the exemplary embodiment are basically identical, each solenoid performs a different function. These subcomponents may be mounted together within a single casting or molding. By way of example, each solenoid may be a 3-way/2-position normally closed solenoid valve that pilots the pneumatic latch valve from one state to another based on the operator's commands.

In the exemplary embodiment, "red" trailer supply valve 252 is situated above pneumatically latching trailer side valve 260 and "red" trailer park solenoid 254 is situated below valve 260; however, these two solenoids may be packaged together in a single housing and may reside on top of or between the latching valves. This combination of solenoids and pneumatic latching valve comprise the portion of the system that pneumatically operates the braking system of the vehicle's trailer (see FIG. 3). Trailer supply line 264 exits pneumatically latching valve 260 and provides pressurized air to tractor protection module 270 by way of line 264a. The trailer supply line feeds the trailer reservoirs and applies or releases the parking and/or emergency brakes.

"Yellow" tractor park release solenoid valve 256 is situated above pneumatically latching tractor side valve 262 and "yellow" tractor park apply solenoid valve 258 is situated below pneumatically latching valve 262; however, these two solenoids may be packaged together in a single housing and may reside on top of or between the latching valves. In the exemplary embodiment, this combination of solenoids and pneumatically latching valve comprise the portion of the system that pneumatically operates spring brake 298, which is located in the tractor portion of the vehicle. Spring brake 298 is supplied with pressurized air by tractor spring brake delivery line 266.

Figure 4:
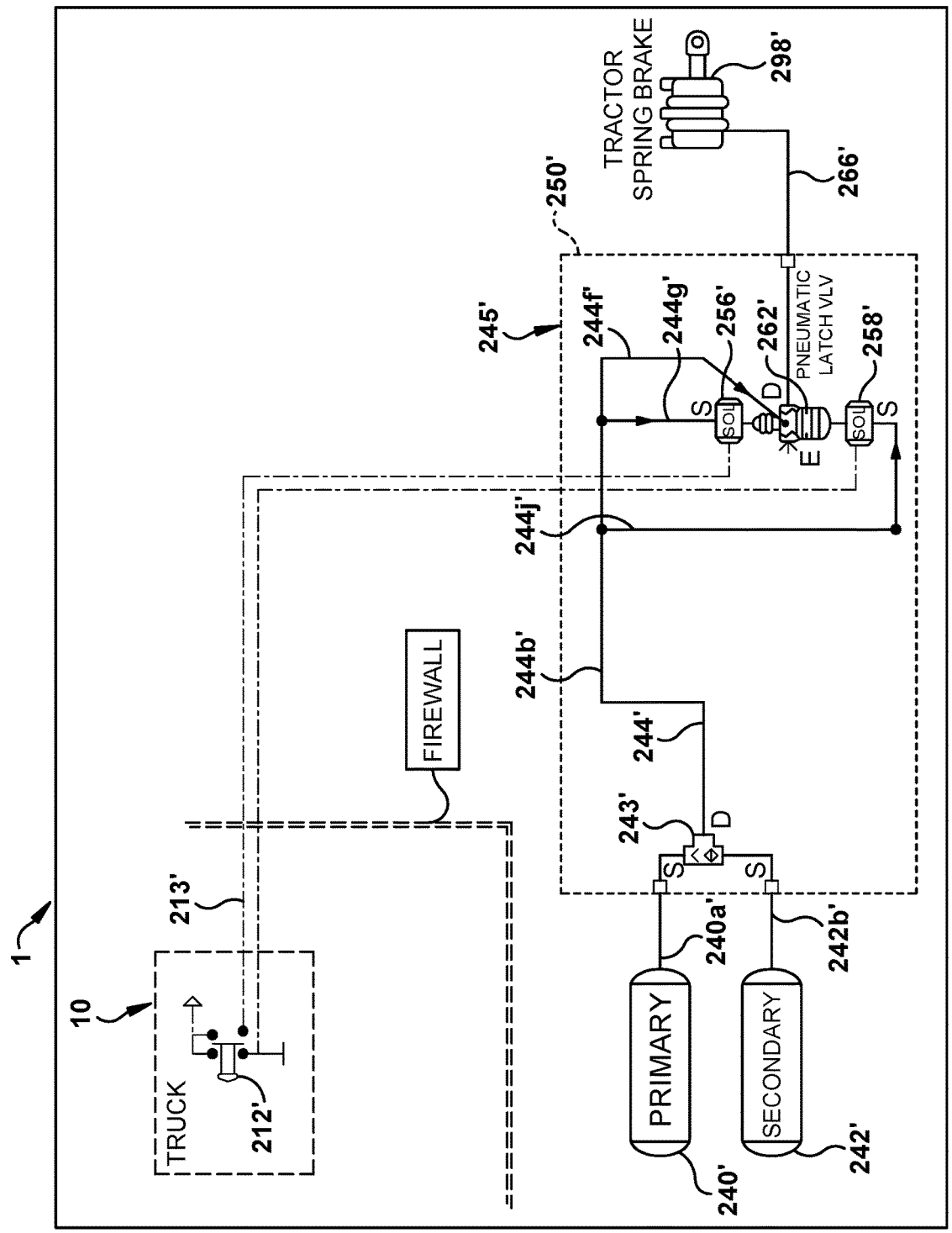
FIG. 4 is a schematic representation of the electro-pneumatic latching valve unit of a parking brake system in use with an electro-pneumatic latching valve unit of an example embodiment incorporated into an air brake system for a vehicle having only a truck, bus, or non-towing vehicle portion.

In the embodiments shown in FIGS. 3 and 4, each pneumatic latching valve is operated by solenoid-piloted air rather than the operator's palm. Current commercially available valves would normally include a "mushroom" button that is manipulated, i.e., pushed in and pulled out by the operator. Here the button has been removed, and the valves are "pushed in" or "pulled out" by pressurized control air from the electrically controlled valves. In the exemplary embodiment, each pneumatically latching valve "pops" automatically under a prescribed air pressure, such as, for example, about 40 psi for trailer brake actuator 214 and about 20 psi for tractor brake actuator 212 regardless of the state of the solenoids.

In the exemplary embodiment, this pressurized air is supplied to the system by primary air reservoir 240 and/or secondary air reservoir 242. Primary supply line 240a, which runs from primary air reservoir 240, and secondary supply line 242b, which runs from secondary air reservoir 242 both connect to double check valve 243, which delivers the greater of the two input pressures. Dual air supply line 244 exits double check valve 243 and then branches into multiple supply lines that provide the solenoids and the pneumatically latching valves with pressurized control and supply air from supply line 244. As shown in FIG. 3, pneumatically latching valve 260 is supplied by supply line 244a and pneumatically latching valve 262 is supplied by supply line 244f. The solenoids are supplied by supply lines 244b and 244d, which are further split into additional supply lines. Solenoid 252 is supplied by supply line 244c, solenoid 254 is supplied by supply line 244e, solenoid 256 is supplied by supply line 244g, and solenoid 258 is supplied by supply line 244h. A dual air gauge (not shown) may be added to system 1 to monitor the air pressure within the pneumatic latch valves, which are the primary outputs of the system.

As shown in FIG. 3, an exemplary embodiment of tractor protection module 270 includes two double check valves and a service line shut-off valve. Primary and secondary air reservoirs 240 and 242 supply pressurized air to foot brake valve 280, which is in communication with double check valve 294 by way of primary foot valve delivery line 281a and secondary foot valve delivery line 281b. Double check valve 294 is in communication with a stop light switch (SLS) and also with double check valve 296 by way of delivery line 294a. Primary and secondary air reservoirs 240 and 242 also supply pressurized air to trailer control valve 290, which is in communication with double check valve 296 by way of trailer control delivery line 290a. Double check valve 296 is in communication with a stop light switch (SLS) and service line shut-off valve by way of delivery line 296a, which delivers to valve 297 the greater of the air pressures received from foot brake valve 280 and trailer control valve 290. Service line shut-off valve 297 delivers pressurized air to trailer service line 297a and provides the tractor protection function by closing the trailer service line in the event that the tractor supply reservoirs have failed or the trailer is otherwise damaged. The trailer service line pressure is proportional to the braking being done by foot or by hand, and is used by the trailer to apply the proportional amount of service brakes for routine stopping of the vehicle.

As with the generic embodiment, when one or the other brake actuator control buttons (yellow and red buttons) is pushed in by the operator, electrical current flows to the solenoid valve located on top the pneumatic latching valve. The solenoid opens and delivers black or control air to the piston within the pneumatic latching valve. The pneumatically latching valve opens, delivering supply air to the terminal system component, e.g., the tractor spring brake. When the brake actuator is released, the top solenoid valve closes and air flow through the solenoid valve ceases, and air delivered to the top of the pneumatically latching valve is exhausted. However, the valve remains open and continues to deliver supply air to the spring brake. When a yellow or red button is pulled outward from the neutral position, the above-described process is reversed. Control air from the solenoid valve on the bottom of the pneumatically latching valve pushes the valve back to the closed position, thereby shutting off the air flow from supply to delivery, and exhausting pressurized air to atmosphere. Thus, as previously stated, even though the electrical power to the system may fail, the pneumatic latching valve remains in its most recent state, i.e., it does not automatically apply the parking brakes due to an electrical failure.

FIG. 4 provides a schematic representation of the EPB release system controller unit 10 as applied to an air brake system for a truck, bus, or non-towing vehicle. In this embodiment, brake system 200' includes a driver interface subsystem 210' and brake control subsystem 245'. Brake control subsystem 245' further includes a remote module 250' and a spring brake 298'. Driver interface system 210' comprises a single electrical switch 212' for energizing solenoids 256' and 258', which in turn controls the operation of pneumatic latching valve 262'. Pressurized air is supplied by primary reservoir 240' and secondary reservoir 242' and travels through lines 240a' and 242b' to double check valve 243'. Pressurized air is then delivered to the various system components by way of pneumatic lines 244', 244b', 244j', 244f', 244g', and 266'.

Figure 5:
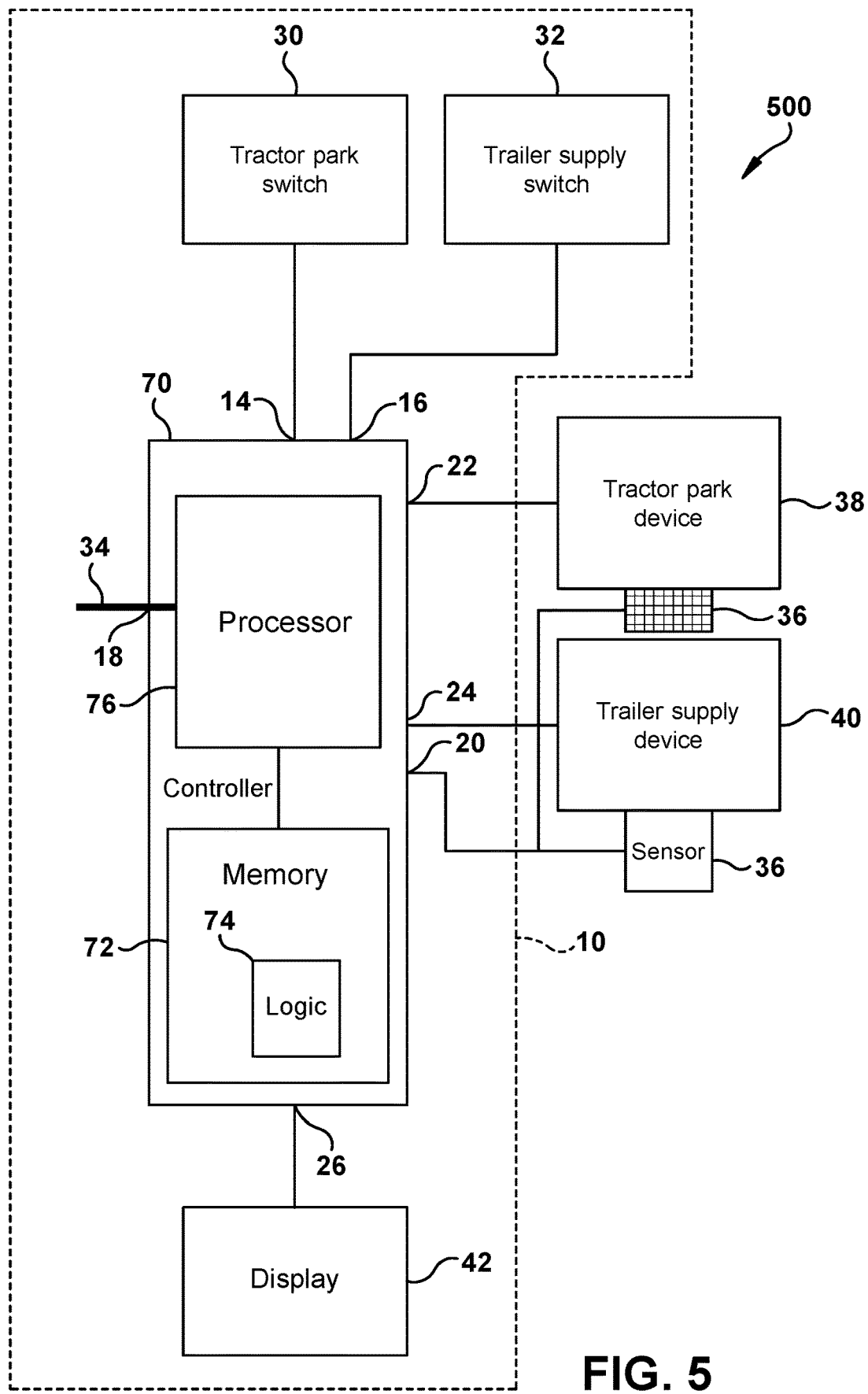
FIG. 5 illustrates a parking brake system on a tractor according to an example embodiment.

FIG. 5 illustrates a parking brake apparatus 500 on a tractor for use with an air braked commercial vehicle. The parking brake apparatus 500 may be an electronic parking brake system. The parking brake system 500 includes a tractor park switch 212. The tractor park switch 212 is located in or on the dash of the vehicle. The driver changes the state of the tractor park switch 212 to indicate that he wants to apply or release the parking brakes of the tractor. The tractor park switch 212 may be a three state electric switch. For example, the driver pulls out the tractor park switch 212 to indicate that he wants to apply the tractor parking brakes, the driver pushes in the tractor park switch 212 to indicate that he wants to release the tractor parking brakes and the driver leaves the tractor park switch 212 in a neutral state to indicate that he wants the tractor parking brakes to remain in the current state. The tractor park switch 212 transmits a signal indicative of the driver's request to either apply the parking brakes of the tractor or to release the parking brakes of the tractor.

The parking brake system 500 includes a trailer supply switch 214. The trailer supply switch 214 is also located in the dash and generally proximate to the tractor park switch 212. The driver changes the state of the trailer supply switch 212 to indicate that he wants to supply air to or evacuate air from the air supply system to the trailer, which also supplies air to the trailer parking brake system. The trailer supply switch 214 may be a three state electric switch. For example, the driver pulls out the trailer supply switch 214 to indicate that he wants to apply the trailer parking brakes, the driver pushes in the trailer supply switch 214 to indicate that he wants to supply air to the trailer to release the trailer parking brakes and the driver leaves the trailer supply switch 214 in the neutral state to indicate that he wants the trailer parking brakes to remain in the current state. The trailer supply switch 214 transmits a signal indicative of the driver's request to either apply the trailer parking brakes or release the parking brakes of the trailer.

The parking brake system 500 includes a tractor park device 38. The tractor park device 38 may be an electro-pneumatic device that applies air to the tractor parking brake actuators in response to a control signal, thereby releasing the parking brakes, or exhausts air to the parking brake actuators in response to a control signal, thereby applying the parking brakes.

The parking brake system 500 includes a trailer supply device 40. The trailer supply device 40 may be an electro-pneumatic device that permits supply air to be transmitted to the trailer in response to a control signal, thereby releasing the parking brakes, or exhausts air in response to a control signal, thereby applying the parking brakes. The trailer supply device 40 may also include a pressure sensor 36 located on the trailer supply device 40 or the pressure sensor 36 may be in pneumatic communication with the supply air to the trailer supply device 40. The pressure sensor 36 measures the supply air pressure delivered to the trailer supply device 40 and transmits a signal indicative of the supply air pressure. The pressure sensor 36 may also be located on the tractor for measuring the supply air pressure delivered to the tractor supply device 38 and transmits a signal indicative of the supply air pressure.

The parking brake system 500 may also include a feedback device, such as display 42, used by the driver to receive information regarding the state of the parking brake system 10. The display 42 may be a lamp or other indicator in the dash. The display 42 may be a driver information system that collects and displays information about the parking brake system 10 as well as other systems on the vehicle.

The parking brake system 500 includes an apparatus 10 for controlling release of the parking brake of the parking brake system of an associated vehicle. The apparatus 10 receives signals from the tractor park switch 212 and the trailer supply switch 214, as well as signals regarding the vehicle operating condition. The apparatus 10 controls the tractor park device 38 and the trailer air supply device 40 to change the parking brake status of the tractor and the trailer. The apparatus 10 may also include functionality to control the anti-lock braking system, the stability system or the engine system on the vehicle.

The apparatus 10 includes an electronic control system 70. The electronic control system 70 includes a non-transient memory device 72, parking brake control logic 74 stored in the non-transient memory device 72, and a processor 76 operably coupled with the non-transient memory device 72. The control logic 74 receives signals from the first input 14, the second input 16, the third input 18 and the pressure input 20 to control the parking brake state of the tractor and trailer through control signals transmitted to the first output 22 and the second output 24. The control logic 74 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 74.

The electronic control system 70 includes several inputs. A first input 14 receives a signal indicative of a request to park a tractor from the tractor park switch 214. A second input 16 receives a signal indicative of a request to supply air to a trailer from the trailer supply switch 212.

A third input 18 receives a signal indicative of the vehicle operating condition. The third input 18 may be a discrete input from a sensor on the vehicle or may be an input compatible with a vehicle serial communications bus 34, such as SAE J1939. The third input 18 receives information about the vehicle operating condition such as vehicle speed, ambient temperature, inclination of the vehicle, temperature of the trailer brakes and foot brake valve actuation.

The electronic control system 70 may include a pressure input 20 for receiving a trailer supply pressure signal from the pressure sensor 36. Alternatively, a trailer supply pressure value may be received via the serial communications bus 34.

The electronic control system 70 includes several outputs. A first output 22 transmits a control signal to the tractor parking brake device 38. The control signal will place the tractor parking brake device 38 in either a supply air mode or an exhaust air mode. A second output 24 transmits a control signal to the trailer supply device 40. The control signal will place the trailer supply device 40 in either a supply air mode or an exhaust air mode. The electronic control system 70 may include a third output 26 for transmitting a signal to the display 42.

Figure 6:
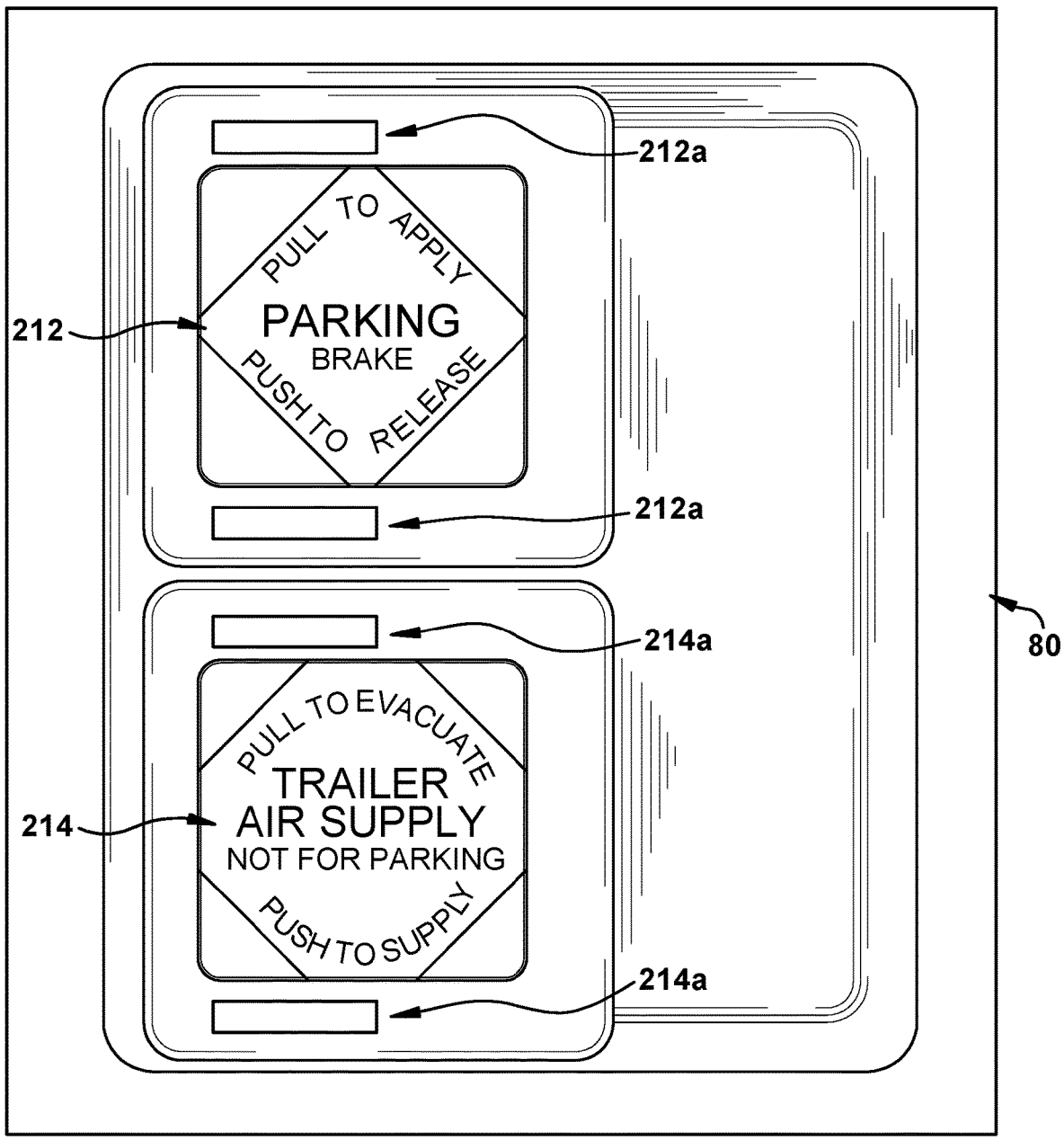
FIG. 6 illustrates a trailer supply switch and a tractor park switch according to an example embodiment.

FIG. 6 illustrates a switch module 80 having tractor park switch 212 and trailer supply switch 214. The switch module 80 may be installed in a dash of an associated vehicle. For this switch module 80, the tractor park switch 212 has a handle end that is capable of being pulled out by a driver when the driver wants to actuate the tractor park brakes. The trailer supply switch 214 also includes a handle portion. The handles are marked, colored or shaped to differentiate the trailer supply switch 214 from the tractor park switch 212.

The tractor park switch 212 and trailer supply switch 214 may be three state switches. For example, the tractor park switch 212 can be moved into a first state, which is a pushed in position, a second state, which is a pulled out position and a third state, which is a neutral position. The tractor park switch 212 is shown in the neutral position in FIG. 6. In order to release the tractor parking brakes, the driver actuates the tractor park switch 212 by pushing in on the handle portion. Pushing in on the handle portion transmits a signal to the electronic control system 70 at input 14 indicating that the handle portion has been pushed in and the driver desires to release the tractor parking brakes. The handle portion may automatically return to the neutral position when the driver removes the force used to push in the handle portion. Alternatively, the handle portion may remain in the pushed in position so the driver has a visual indication that the tractor park brakes are released. The handle portion will remain in the pushed in position until the driver moves the handle portion to the pulled out position.

The driver actuates the tractor park switch 30 by pulling out on the handle 54. Pulling out on the handle transmits a signal to the electronic control system 70 at the input 14 indicating that the handle 54 has been pulled out and the driver desires to apply the tractor parking brakes. The handle 54 may automatically return to the neutral position when the driver removes the force used to pull out the handle 54.

Alternatively, the handle 54 may remain in the pulled out position so the driver has a visual indication that the tractor park brakes are applied.

The trailer supply switch 214 can moved into a first state, which is a pushed in position, a second state, which is a pulled out position and a third state, which is a neutral position. The trailer supply switch 214 is shown in the pulled out position in FIG. 6. The driver will pull out on the handle when he desires to release air from the trailer supply and thereby park the trailer. Pulling out on the handle transmits a signal to the electronic control system 70 at input 16 indicating that the handle has been pulled out and the driver desires to release air from the trailer supply. The handle may automatically return to the neutral position when the driver removes the force used to pull out the handle. Alternatively, the handle may remain in the pulled out position so the driver has a visual indication that the trailer air supply is released. The handle will remain in the pulled out position until the driver moves the handle to the pushed in position.

The driver actuates the trailer supply switch 214 by pushing in the handle. Pushing in the handle transmits a signal to the electronic control system 70 at input 16 indicating that the handle has been pushed in and the driver desires to supply air to the trailer. The handle may automatically return to the neutral position when the driver removes the force used to push in the handle. Alternatively, the handle may remain in the pushed in position so the driver has a visual indication that the trailer air supply is applied.

Alternatively, tractor park switch 30 and the trailer supply switch 214 may be rocker switches having three positions. From a neutral position (e.g. the third state), a rocker switch for the tractor park switch 30 may be pushed near the top to an engage park brakes position (e.g., the second state), and pushed near the bottom to a disengage park brakes position (e.g., the first state). In another example, the tractor park switch 212 and the trailer supply switch 214 may be twistable. From a neutral position (e.g. the third state), a twistable switch for the tractor park switch 212 may be twisted to the right to an engage park brakes position (e.g. the second state), and twisted to the left to a disengage park brakes position (e.g., the first state).

In switch module 80, the application of the trailer parking brakes at the same time as application of the tractor parking brakes may not be implemented in every instance, as will be described further.

Figure 7:
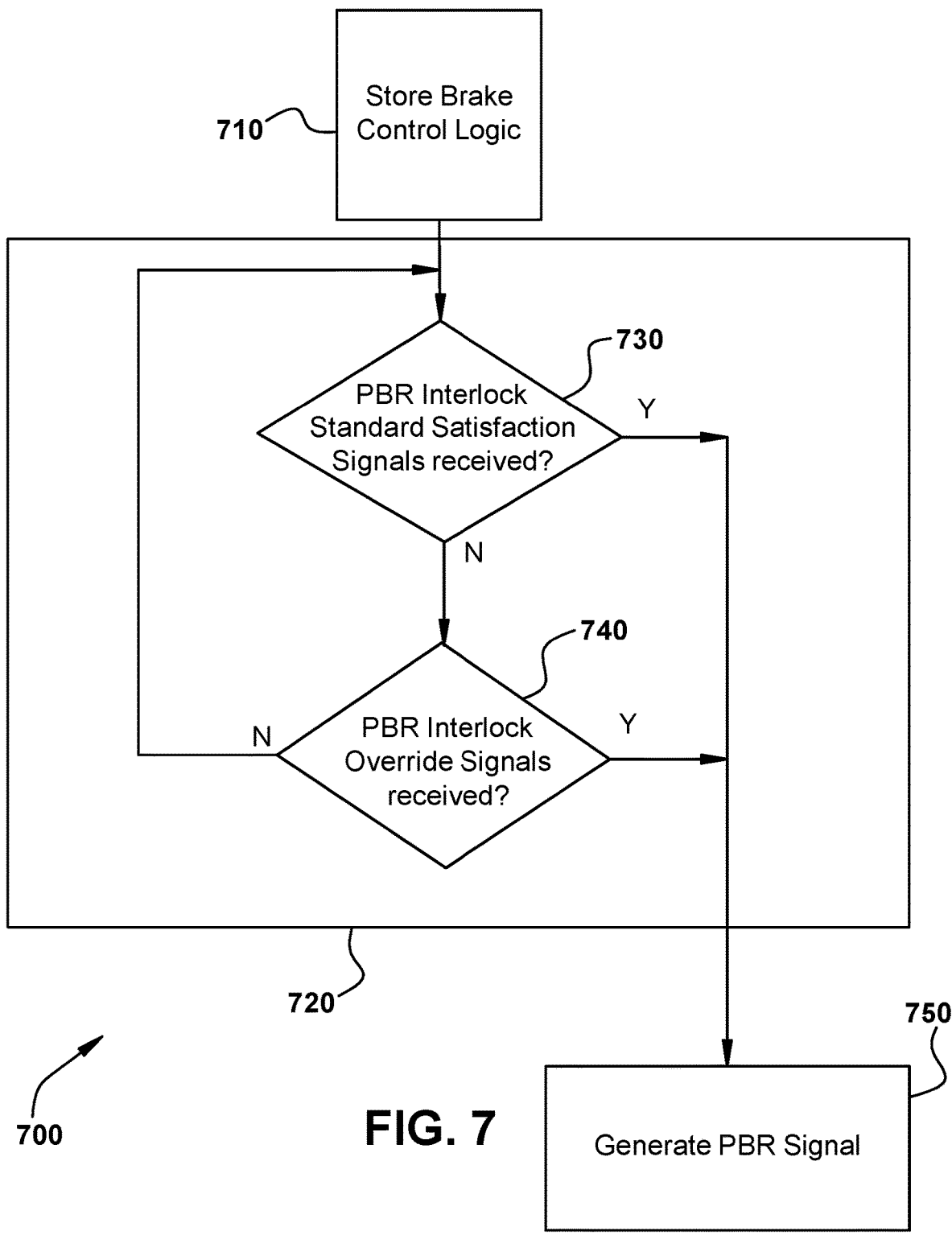
FIG. 7 is a flow chart showing a method of releasing a parking brake of an associated vehicle in accordance with an example embodiment.

FIG. 7 is a flow chart showing a method 700 of releasing a parking brake of an associated vehicle in accordance with an example embodiment. With reference now to that Figure, the method includes storing parking brake control logic in a non-transient memory device of an electronic control system of an apparatus, and executing the parking brake control logic by a processor operatively coupled with the non-transient memory device to selectively generate a parking brake release (PBR) signal based on the electronic control system of the apparatus receiving a set of predetermined PBR interlock override signals in an absence of receiving fully all of a set of predetermined PBR interlock standard satisfaction signals, wherein receiving fully all of the set of predetermined PBR interlock standard satisfaction signals causes the processor executing the parking brake control logic to generate the PBR signal, wherein the set of predetermined PBR interlock override signals is different than the set of predetermined PBR interlock standard satisfaction signals, wherein the PBR signal is deliverable for use by the associated vehicle to effect the release of the parking brake of the parking brake system of the associated vehicle.

In the method, parking brake control logic is stored in step 710 in a non-transient memory device of an electronic control system of an apparatus.

In step 720, the parking brake control logic is executed by a processor operatively coupled with the non-transient memory device to selectively generate a parking brake release (PBR) signal based on the electronic control system of the apparatus receiving a set of predetermined PBR interlock override signals in an absence of receiving fully all of a set of predetermined PBR interlock standard satisfaction signals, wherein the set of predetermined PBR interlock override signals is different than the set of predetermined PBR interlock standard satisfaction signals.

More particularly, it is determined in step 730 whether fully all of a set of predetermined PBR interlock standard satisfaction signals are received by the electronic control system of the apparatus.

In an absence of the electronic control system of the apparatus receiving fully all of the set of predetermined PBR interlock standard satisfaction signals at step 730, the method 700 continues to step 740 where it is determined whether a set of predetermined PBR interlock override signals is received by the electronic control system in the absence of the electronic control system receiving fully all of a set of predetermined PBR interlock standard satisfaction signals.

If it is determined in step 730 that fully all of the set of predetermined PBR interlock standard satisfaction signals are received by the electronic control system of the apparatus, the processor executes the parking brake control logic in step 750 to generate the PBR signal. The PBR signal is deliverable for use by the associated vehicle to effect the release of the parking brake of the parking brake system of the associated vehicle.

If it is determined at step 740 that the set of predetermined PBR interlock override signals are received by the electronic control system of the apparatus in an absence of receiving fully all of a set of predetermined PBR interlock standard satisfaction signals in step 730, the processor executes the parking brake control logic in step 750 to generate the PBR signal. The PBR signal is deliverable for use by the associated vehicle to effect the release of the parking brake of the parking brake system of the associated vehicle.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. An apparatus for controlling release of a parking brake of a parking brake system of an associated vehicle, the apparatus comprising:
an electronic control system comprising:
a non-transient memory device;
parking brake control logic stored in the non-transient memory device; and
a processor operably coupled with the non-transient memory device, the processor being operable to execute the parking brake control logic to:
selectively generate a parking brake release (PBR) signal based on receiving:
a set of predetermined PBR interlock override signals in an absence of receiving fully all of a set of predetermined PBR interlock standard satisfaction signals,
wherein receiving fully all of the set of predetermined PBR interlock standard satisfaction signals causes the processor executing the parking brake control logic to generate the PBR signal,
wherein the set of predetermined PBR interlock override signals is different than the set of predetermined PBR interlock standard satisfaction signals,
wherein the PBR signal is deliverable for use by the associated vehicle to cause the release of the parking brake of the parking brake system of the associated vehicle.

2. The apparatus according to claim 1, wherein:
the processor is operable to execute the parking brake control logic to selectively generate the PBR signal based on the electronic control system receiving the set of predetermined PBR interlock override signals in the absence of receiving fully all of the set of predetermined PBR interlock standard satisfaction signals;
the set of predetermined PBR interlock override signals comprises one or more signals not being a member of the set of predetermined PBR interlock standard satisfaction signals; and
the set of predetermined PBR interlock standard satisfaction signals comprises one or more signals not being a member of the set of predetermined PBR interlock override signals.

3. The apparatus according to claim 1, wherein:
the processor is operable to execute the parking brake control logic to selectively generate the PBR signal based on the electronic control system receiving the set of predetermined PBR interlock override signals in the absence of receiving fully all of the set of predetermined PBR interlock standard satisfaction signals;
the set of predetermined PBR interlock override signals comprises:
a set of predetermined operator PBR interlock override request signals representative of a PBR interlock override request received from an operator of the associated vehicle; and
a set of predetermined vehicle PBR override operating condition signals representative of one or more operating conditions of the associated vehicle disposed in a PBR interlock override posture by the operator; and
the set of predetermined PBR interlock standard satisfaction signals comprises:
a set of predetermined operator PBR interlock standard satisfaction request signals representative of a PBR interlock standard satisfaction request received from the operator of the associated vehicle; and
a set of predetermined vehicle PBR standard operating condition signals representative of one or more operating conditions of the associated vehicle disposed in a PBR interlock standard satisfaction posture by the operator.

4. The apparatus according to claim 3, wherein the processor is operable to execute the parking brake control logic to generate the PBR signal based on:
the electronic control system receiving the set of predetermined operator PBR interlock standard satisfaction request signals comprising:
a service brake pedal actuated signal representative of a service brake pedal being actuated by the operator of the associated vehicle; and
an instrument panel switch signal representative of a switch on an instrument panel of the associated vehicle being actuated by the operator; and
the electronic control system receiving the set of predetermined vehicle PBR standard operating condition signals comprising:
an ignition ON signal representative of an ignition of the associated vehicle being in an active state;
an engine running signal represented of an operating condition of an engine of the associated vehicle;
a transmission engaged signal representative of a shift protocol of a transmission of the associated vehicle being competed; and
one or more vehicle operational readiness signals representative of a readiness of operation of the associated vehicle by the operator.

5. The apparatus according to claim 4, wherein the processor is operable to execute the parking brake control logic to generate the PBR signal based on:
the electronic control system receiving the set of predetermined operator PBR interlock override request signals comprising:
an accelerator pedal actuated signal representative of an accelerator pedal being actuated by the operator of the associated vehicle; and
the instrument panel switch signal; and
the electronic control system receiving the set of predetermined vehicle PBR override operating condition signals comprising:
the ignition ON signal;
the engine running signal; and
the transmission engaged signal.

6. The apparatus according to claim 3, wherein the processor is operable to execute the parking brake control logic to generate the PBR signal based on:
the electronic control system receiving the set of predetermined operator PBR interlock override request signals comprising:
an accelerator pedal actuated signal representative of an accelerator pedal being actuated by the operator of the associated vehicle; and
an instrument panel switch signal representative of a switch on an instrument panel of the associated vehicle being actuated by the operator; and
the electronic control system receiving the set of predetermined vehicle PBR override operating condition signals comprising:
an ignition ON signal representative of an ignition of the associated vehicle being in an active state;
an engine running signal represented of an operating condition of an engine of the associated vehicle; and a transmission engaged signal representative of a shift protocol of a transmission of the associated vehicle being competed.

7. The apparatus according to claim 6, wherein the processor is operable to execute the parking brake control logic to:
generate the PBR signal based on the electronic control system receiving the sets of predetermined operator PBR interlock override request and vehicle PBR override operating condition signals; and
sustain generating the PBR signal in an absence of the electronic control system receiving the instrument panel switch signal based on:
the electronic control system receiving a vehicle speed signal representative of a moving speed of the associated vehicle; and
the electronic control system determining the vehicle speed signal being above a predetermined override speed increasing latch value stored in the non-transient memory device.

8. The apparatus according to claim 7, wherein the processor is operable to execute the parking brake control logic to:
cease generating the PBR signal in the absence of the electronic control system receiving the instrument panel switch signal based on:
the electronic control system determining the vehicle speed signal being below a predetermined override speed decreasing latch value stored in the non-transient memory device, wherein the predetermined override speed decreasing latch value is less than the predetermined override speed increasing latch value.

9. A method of controlling release of a parking brake of a parking brake system of an associated vehicle, the method comprising:
storing parking brake control logic in a non-transient memory device of an electronic control system of an apparatus; and
executing the parking brake control logic by a processor operatively coupled with the non-transient memory device to:
selectively generate a parking brake release (PBR) signal based on the electronic control system of the apparatus receiving:
a set of predetermined PBR interlock override signals in an absence of receiving fully all of a set of predetermined PBR interlock standard satisfaction signals,
wherein receiving fully all of the set of predetermined PBR interlock standard satisfaction signals causes the processor executing the parking brake control logic to generate the PBR signal,
wherein the set of predetermined PBR interlock override signals is different than the set of predetermined PBR interlock standard satisfaction signals,
wherein the PBR signal is deliverable for use by the associated vehicle to cause the release of the parking brake of the parking brake system of the associated vehicle.

10. The method according to claim 9, wherein:
the executing the parking brake control logic by the processor to selectively generate the PBR signal comprises:
executing the parking brake control logic by the processor to selectively generate the PBR signal based on the electronic control system receiving the set of predetermined PBR interlock override signals comprising one or more signals not being a member of the set of predetermined PBR interlock standard satisfaction signals in the absence of receiving fully all of the set of predetermined PBR interlock standard satisfaction signals comprising one or more signals not being a member of the set of predetermined PBR interlock override signals.

11. The method according to claim 9, wherein:
the executing the parking brake control logic by the processor to selectively generate the PBR signal comprises:
executing the parking brake control logic by the processor to selectively generate the PBR signal based on the electronic control system receiving the set of predetermined PBR interlock override signals comprising:
a set of predetermined operator PBR interlock override request signals representative of a PBR interlock override request received from an operator of the associated vehicle; and
a set of predetermined vehicle PBR override operating condition signals representative of one or more operating conditions of the associated vehicle disposed in a PBR interlock override posture by the operator;
in the absence of receiving fully all of the set of predetermined PBR interlock standard satisfaction signals comprising:
a set of predetermined operator PBR interlock standard satisfaction request signals representative of a PBR interlock standard satisfaction request received from the operator of the associated vehicle; and
a set of predetermined vehicle PBR standard operating condition signals representative of one or more operating conditions of the associated vehicle disposed in a PBR interlock standard satisfaction posture by the operator.

12. The method according to claim 11, wherein:
the executing the parking brake control logic by the processor to selectively generate the PBR signal comprises:
executing the parking brake control logic by the processor to selectively generate the PBR signal based on:
the electronic control system receiving the set of predetermined operator PBR interlock standard satisfaction request signals comprising:
a service brake pedal actuated signal representative of a service brake pedal being actuated by the operator of the associated vehicle; and
an instrument panel switch signal representative of a switch on an instrument panel of the associated vehicle being actuated by the operator; and
the electronic control system receiving the set of predetermined vehicle PBR standard operating condition signals comprising:
an ignition ON signal representative of an ignition of the associated vehicle being in an active state;
an engine running signal represented of an operating condition of an engine of the associated vehicle;
a transmission engaged signal representative of a shift protocol of a transmission of the associated vehicle being competed; and one or more vehicle operational readiness signals representative of a readiness of operation of the associated vehicle by the operator.

13. The method according to claim 12, wherein:
the executing the parking brake control logic by the processor to selectively generate the PBR signal comprises:
executing the parking brake control logic by the processor to selectively generate the PBR signal based on:
the electronic control system receiving the set of predetermined operator PBR interlock override request signals comprising:
an accelerator pedal actuated signal representative of an accelerator pedal being actuated by the operator of the associated vehicle; and
an instrument panel switch signal representative of a switch on an instrument panel of the associated vehicle being actuated by the operator; and
the electronic control system receiving the set of predetermined vehicle PBR override operating condition signals comprising:
an ignition ON signal representative of an ignition of the associated vehicle being in an active state;
an engine running signal represented of an operating condition of an engine of the associated vehicle; and
a transmission engaged signal representative of a shift protocol of a transmission of the associated vehicle being competed.

14. The method according to claim 11, wherein:
the executing the parking brake control logic by the processor to selectively generate the PBR signal comprises:
executing the parking brake control logic by the processor to selectively generate the PBR signal based on:
the electronic control system receiving the set of predetermined operator PBR interlock override request signals comprising:
an accelerator pedal actuated signal representative of an accelerator pedal being actuated by the operator of the associated vehicle; and
the instrument panel switch signal; and
the electronic control system receiving the set of predetermined vehicle PBR override operating condition signals comprising:
the ignition ON signal;
the engine running signal; and
the transmission engaged signal.

15. The method according to claim 14, further comprising:
sustaining generating the PBR signal in an absence of the electronic control system receiving the instrument panel switch signal based on:
the electronic control system receiving a vehicle speed signal representative of a moving speed of the associated vehicle; and
the electronic control system determining the vehicle speed signal being above a predetermined override speed increasing latch value stored in the non-transient memory device.

16. The method according to claim 15, further comprising:
ceasing generating the PBR signal in the absence of the electronic control system receiving the instrument panel switch signal based on:
the electronic control system determining the vehicle speed signal being below a predetermined override speed decreasing latch value stored in the non-transient memory device, wherein the predetermined override speed decreasing latch value is less than the predetermined override speed increasing latch value.

17. A computer readable medium storing instructions thereon that are executable by a processor to perform a method for controlling release of a parking brake of a parking brake system of an associated vehicle, the method comprising:
selectively generating a parking brake release (PBR) signal based on receiving:
a set of predetermined PBR interlock override signals in an absence of receiving fully all of a set of predetermined PBR interlock standard satisfaction signals,
wherein receiving fully all of the set of predetermined PBR interlock standard satisfaction signals causes the processor executing the parking brake control logic to generate the PBR signal,
wherein the set of predetermined PBR interlock override signals is different than the set of predetermined PBR interlock standard satisfaction signals,
wherein the PBR signal is deliverable for use by the associated vehicle to cause the release of the parking brake of the parking brake system of the associated vehicle.

18. The computer readable medium according to claim 17, wherein the selectively generating the PBR signal based on receiving the set of predetermined PBR interlock override signals in the absence of receiving fully all of the set of predetermined PBR interlock standard satisfaction signals comprises:
selectively generating the PBR signal based on receiving the set of predetermined PBR interlock override signals comprising:
a set of predetermined operator PBR interlock override request signals representative of a PBR interlock override request received from an operator of the associated vehicle; and
a set of predetermined vehicle PBR override operating condition signals representative of one or more operating conditions of the associated vehicle disposed in a PBR interlock override posture by the operator;
in the absence of receiving fully all of the set of predetermined PBR interlock standard satisfaction signals comprising:
a set of predetermined operator PBR interlock standard satisfaction request signals representative of a PBR interlock standard satisfaction request received from the operator of the associated vehicle; and
a set of predetermined vehicle PBR standard operating condition signals representative of one or more operating conditions of the associated vehicle disposed in a PBR interlock standard satisfaction posture by the operator.

19. The computer readable medium according to claim 18, wherein the selectively generating the PBR signal comprises selectively generating the PBR signal based on:
receiving the set of predetermined operator PBR interlock standard satisfaction request signals comprising:

a service brake pedal actuated signal representative of a service brake pedal being actuated by the operator of the associated vehicle; and an instrument panel switch signal representative of a switch on an instrument panel of the associated vehicle being actuated by the operator; and receiving the set of predetermined vehicle PBR standard operating condition signals comprising:

an ignition ON signal representative of an ignition of the associated vehicle being in an active state;

an engine running signal represented of an operating condition of an engine of the associated vehicle;

a transmission engaged signal representative of a shift protocol of a transmission of the associated vehicle being competed; and one or more vehicle operational readiness signals representative of a readiness of operation of the associated vehicle by the operator.

20. The computer readable medium according to claim 19, wherein the selectively generating the PBR signal comprises selectively generating the PBR signal based on:

receiving the set of predetermined operator PBR interlock override request signals comprising:

an accelerator pedal actuated signal representative of an accelerator pedal being actuated by the operator of the associated vehicle; and the instrument panel switch signal; and receiving the set of predetermined vehicle PBR override operating condition signals comprising:

the ignition ON signal;

the engine running signal; and the transmission engaged signal.

* * * * *